(12) United States Patent
Wakazono et al.

(10) Patent No.: US 10,911,686 B2
(45) Date of Patent: Feb. 2, 2021

(54) ZOOM CONTROL DEVICE, ZOOM CONTROL METHOD, AND PROGRAM

(71) Applicant: Sony Corporation, Tokyo (JP)

(72) Inventors: Masafumi Wakazono, Tokyo (JP); Takahiro Mori, Kanagawa (JP); Kouji Yamamoto, Kanagawa (JP); Masakazu Ebihara, Tokyo (JP); Masaya Kinoshita, Kanagawa (JP); Yuki Ono, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/165,007

(22) Filed: Oct. 19, 2018

(65) Prior Publication Data

US 2019/0082111 A1    Mar. 14, 2019

Related U.S. Application Data

(63) Continuation of application No. 15/321,075, filed as application No. PCT/JP2015/002490 on May 18, 2015, now Pat. No. 10,158,808.

(30) Foreign Application Priority Data

Jul. 2, 2014   (JP) .................. 2014-136589

(51) Int. Cl.
*H04N 5/225* (2006.01)
*H04N 5/232* (2006.01)
*G02B 7/08* (2006.01)

(52) U.S. Cl.
CPC .......... *H04N 5/23296* (2013.01); *G02B 7/08* (2013.01); *H04N 5/225* (2013.01); *H04N 5/23293* (2013.01); *H04N 5/232933* (2018.08)

(58) Field of Classification Search
CPC ............. H04N 5/23296; H04N 5/3454; H04N 5/23216; G08B 13/1963; G08B 13/19689
See application file for complete search history.

(56) References Cited

U.S. PATENT DOCUMENTS

| 5,420,632 A | 5/1995 | Yamagiwa |
| 6,046,770 A | 4/2000 | Uemura et al. |

(Continued)

FOREIGN PATENT DOCUMENTS

| JP | 10-042183 | 2/1998 |
| JP | 2003-179799 A | 6/2003 |

(Continued)

OTHER PUBLICATIONS

Japanese Office Action dated Sep. 25, 2018 for corresponding Japanese Application No. 2016-530809.

(Continued)

*Primary Examiner* — Twyler L Haskins
*Assistant Examiner* — Dwight Alex C Tejano
(74) *Attorney, Agent, or Firm* — Michael Best & Friedrich LLP

(57) ABSTRACT

A zoom control device includes: a zoom magnification ratio change speed setting unit that sets a main image zoom magnification ratio change speed and a monitoring image zoom magnification ratio change speed according to a zoom operation by a user; and a zoom control unit that conducts a zoom control on a main image so that a zoom magnification ratio changes according to the main image zoom magnification ratio change speed, and conducts a zoom control on a monitoring image so that the zoom magnification ratio changes according to the monitoring image zoom magnification ratio change speed. The zoom magnification ratio change speed setting unit is configured to set the main image zoom magnification ratio change speed by smoothing (Continued)

the monitoring image zoom magnification ratio change speed.

20 Claims, 13 Drawing Sheets

(56) References Cited

U.S. PATENT DOCUMENTS

| | | | | |
|---|---|---|---|---|
| 2001/0040630 | A1* | 11/2001 | Matsuzaka | H04N 5/2628 348/240.99 |
| 2005/0254808 | A1 | 11/2005 | Okawara | |
| 2006/0152604 | A1 | 7/2006 | Ishikawa | |
| 2006/0291841 | A1 | 12/2006 | Fukumoto et al. | |
| 2009/0167897 | A1 | 7/2009 | Fujita | |
| 2010/0165479 | A1* | 7/2010 | Ishikawa | G02B 7/102 359/683 |
| 2010/0188533 | A1* | 7/2010 | Maniwa | G03B 13/36 348/240.99 |
| 2010/0295970 | A1* | 11/2010 | Suzuki | H04N 5/232 348/240.3 |
| 2011/0032412 | A1 | 2/2011 | Higuchi | |
| 2011/0128392 | A1 | 6/2011 | Kumagai | |
| 2012/0133822 | A1* | 5/2012 | Kawai | G02B 7/282 348/347 |
| 2016/0234444 | A1 | 6/2016 | Hosono | |

FOREIGN PATENT DOCUMENTS

| | | | |
|---|---|---|---|
| JP | 2004-007261 | A | 1/2004 |
| JP | 2004-252370 | A | 9/2004 |
| JP | 2007-329689 | A | 12/2007 |
| JP | 2008-53769 | A | 3/2008 |
| JP | 2009-204888 | A | 9/2009 |
| JP | 2009-260413 | A | 11/2009 |
| JP | 2010-56698 | A | 3/2010 |
| JP | 2010-98350 | A | 4/2010 |
| JP | 2011-040945 | A | 2/2011 |
| JP | 2011-166497 | A | 8/2011 |
| JP | 2011166497 | A * | 8/2011 |
| JP | 2011166497 | A * | 8/2011 |
| JP | 2011-172649 | A | 9/2011 |
| JP | 2012-124624 | A | 6/2012 |
| JP | 2014-143519 | A | 8/2014 |

OTHER PUBLICATIONS

Extended European Search Report dated Jan. 26, 2018 for corresponding European Patent Application No. 15 814 275.2.
Chinese Office Action dated Oct. 8, 2018 for corresponding Chinese Application No. 201580034500.X.

* cited by examiner

FIG. 7

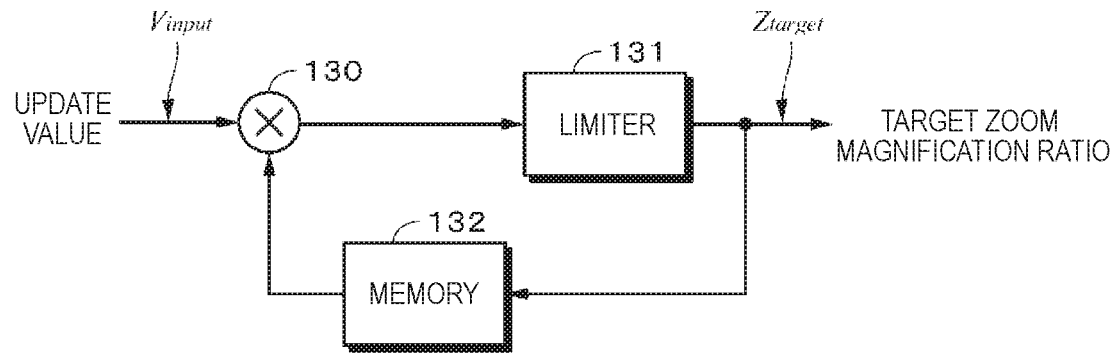

FIG. 8

| IMAGING CONDITIONS | | DEGREE OF SMOOTHING |
|---|---|---|
| RECORDING STATE | RECORDING | ON |
| | STANDING BY TO RECORD | OFF |
| ZOOM LENS POSITIONED AT END | | OFF |
| FAST CAMERA MOVEMENT SPEED | | SMALL |
| CAMERA VIBRATION | LARGE | SMALL |
| | SMALL | LARGE |
| USER INDICATION OF FAST ZOOM OPERATION METHOD | | SMALL |
| IMAGING MODE | OVERCRANK IMAGING MODE | SMALL |
| | UNDERCRANK IMAGING MODE | LARGE |
| | LANDSCAPE MODE | LARGE |
| | NIGHT MODE | LARGE |
| | SPORTS MODE | SMALL |
| | LOW FRAME RATE | LARGE |

ZOOM CONTROL DEVICE, ZOOM CONTROL METHOD, AND PROGRAM

CROSS REFERENCES TO RELATED APPLICATIONS

The present Application is a Continuation Application of U.S. patent application Ser. No. 15/321,075 filed Dec. 21, 2016, which is a 371 National Stage Entry of International Application No. PCT/JP2015/002490, filed on May 18, 2015, which in turn claims priority from Japanese Application No. 2014-136589, filed on Jul. 2, 2014, the entire contents of which are incorporated herein by reference.

TECHNICAL FIELD

The present disclosure relates to a zoom control device, a zoom control method, and a program.

BACKGROUND ART

In a camera system, a user may shoot a video while executing a zoom function by operating a zoom key (see Patent Literature 1, for example).

CITATION LIST

Patent Literature

Patent Literature 1: JP 2004-252370A

DISCLOSURE OF INVENTION

Technical Problem

If a user who is not used to zoom operations shoots a video, in some cases a scene may be shot in which the subject is zoomed in (enlarged) or zoomed out (reduced) at sudden zoom speeds due to inappropriate zoom operations. Since such scenes risk making a viewer who views the video uncomfortable, improvement is desired.

Consequently, one objective of the present disclosure is to provide a zoom control device, a zoom control method, and a program devised in light of the above point.

Solution to Problem

To solve the problem, the present disclosure is, for example, a zoom control device, including: a zoom magnification ratio change speed setting unit that sets a main image zoom magnification ratio change speed and a monitoring image zoom magnification ratio change speed according to a zoom operation by a user; and a zoom control unit that conducts a zoom control on a main image so that a zoom magnification ratio changes according to the main image zoom magnification ratio change speed, and conducts a zoom control on a monitoring image so that the zoom magnification ratio changes according to the monitoring image zoom magnification ratio change speed. The zoom magnification ratio change speed setting unit is configured to set the main image zoom magnification ratio change speed by smoothing the monitoring image zoom magnification ratio change speed.

The present disclosure is, for example, a zoom control method, including: setting, by a zoom magnification ratio change speed setting unit, a main image zoom magnification ratio change speed and a monitoring image zoom magnification ratio change speed according to a zoom operation by a user; and conducting, by a zoom control unit, a zoom control on a main image so that a zoom magnification ratio changes according to the main image zoom magnification ratio change speed, and conducting a zoom control on a monitoring image so that the zoom magnification ratio changes according to the monitoring image zoom magnification ratio change speed. The zoom magnification ratio change speed setting unit sets the main image zoom magnification ratio change speed by smoothing the monitoring image zoom magnification ratio change speed.

The present disclosure is, for example, a program causing a computer to execute a zoom control method including: setting, by a zoom magnification ratio change speed setting unit, a main image zoom magnification ratio change speed and a monitoring image zoom magnification ratio change speed according to a zoom operation by a user; and conducting, by a zoom control unit, a zoom control on a main image so that a zoom magnification ratio changes according to the main image zoom magnification ratio change speed, and conducting a zoom control on a monitoring image so that the zoom magnification ratio changes according to the monitoring image zoom magnification ratio change speed. The zoom magnification ratio change speed setting unit sets the main image zoom magnification ratio change speed by smoothing the monitoring image zoom magnification ratio change speed.

The present disclosure is, for example, a zoom control device, including: a monitoring image zoom magnification ratio control unit that controls an operation of changing a monitoring image zoom magnification ratio according to a monitoring image zoom magnification ratio change speed based on a zoom operation by a user; and a main image zoom magnification ratio control unit that controls an operation of changing a main image zoom magnification ratio according to a main image zoom magnification ratio change speed obtained by conducting a smoothing process on the monitoring image zoom magnification ratio change speed.

Advantageous Effects of Invention

According to at least one embodiment, it is possible to obtain an image in which appropriate zoom control has been performed. However, the advantageous effect described herein is not necessarily limited, and may also be any of the advantageous effects described in this disclosure. Additionally, the content of the present disclosure is not to be interpreted as being limited by the advantageous effects given as an example.

BRIEF DESCRIPTION OF DRAWINGS

FIG. 7 is a diagram for explaining an example of a process of updating a target zoom magnification ratio.

FIG. 8 is a diagram illustrating an example of a degree of smoothing according to imaging conditions.

MODE(S) FOR CARRYING OUT THE INVENTION

Hereinafter, multiple embodiments of the present disclosure will be described with reference to the drawings. Note that the description will proceed in the following order.
<1. First embodiment>
<2. Second embodiment>
<3. Third embodiment>
<4. Fourth embodiment>
<5. Modifications>

The embodiments and the like described hereinafter are specific favorable examples of the present disclosure, but the content of the present disclosure is not limited to these embodiments and the like.

[Overview of Present Disclosure]

Figure 1:
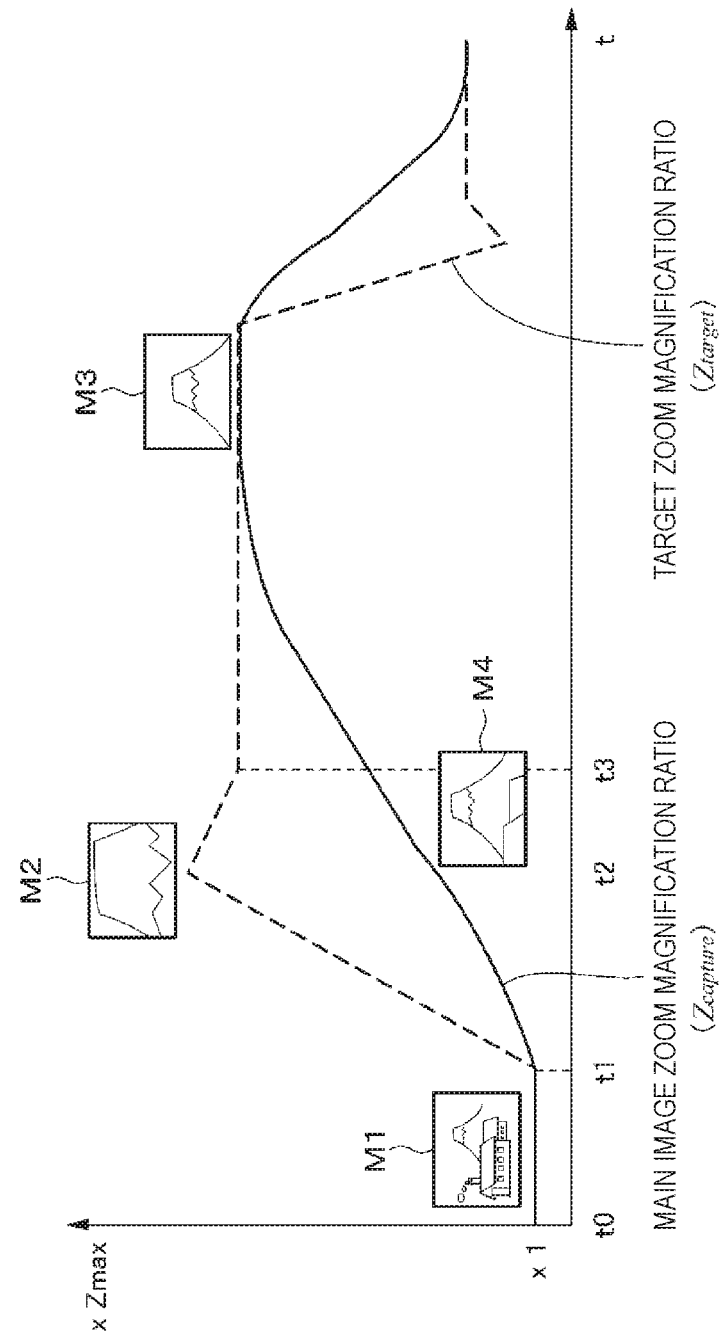
FIG. 1 is a diagram for explaining an overview of an embodiment of the present disclosure.

First, an overview of the present disclosure will be described with reference to FIG. 1. In FIG. 1, the horizontal axis represents the time axis, while the vertical axis represents the zoom magnification ratio. Also, in FIG. 1, examples of images corresponding to zoom magnification ratios are illustrated.

For example, at the timing of time t0, the user uses an imaging device to start shooting a video. The shot video may be recorded in the imaging device, or may be transmitted to external equipment without being recorded. For example, by transmitting the shot video without recording, the conditions of the subject being shot may be checked at a remote location or the like (also known as live streaming). Additionally, a process for displaying an already-shot video may be considered playback. This playback is not limited to playing back videos recorded in the imaging device, and may also be conducted outside the imaging device. Additionally, a video recorded in the imaging device may be read out from a recording medium, but the display thereof may be presented on external equipment. The initial image, which is the image M1, includes multiple houses and a mountain, for example. At the timing of time t1, the user operates a zoom key. The change in the zoom magnification ratio in response to the zoom key operation is indicated by the dashed line. According to the zoom key operation, the area near the mountain is zoomed in.

At this point, if the user's zoom operation is not appropriate, such as if the operation magnitude on the zoom key is too large, for example, the area near the mountain is enlarged too much (image M2 at timing t2). To achieve the intended zooming, the user finely adjusts the zoom key to zoom out (the operation from timing t2 to timing t3), and obtains the image M3 in which the mountain is enlarged to a suitable degree. When playing back a video recorded in this way, since the area near the mountain is zoomed in suddenly and then zoomed out, the video includes an unnecessary change of zoom magnification ratio, and may make viewers uncomfortable in some cases. Also, zooming at an excessive change speed of the zoom magnification ratio (the excessive slope between t1 and t2 in FIG. 2) and sudden accelerations or decelerations in the zoom magnification ratio (the discontinuities in the slope at t1 and t2) may also make viewers uncomfortable in some cases.

If the user performs appropriate zoom operations, the above problems do not occur. However, in recent years, as imaging devices become more compact, the operating units that accept zoom operations likewise are becoming more compact. For this reason, it is becoming difficult for a user to perform appropriate zoom operations reliably and capture a subject at the intended size.

On the other hand, as a potential technology (not technology of the related art), it is conceivable to avoid the above problems by uniformly slowing down the change speed of the zoom magnification ratio (zoom magnification ratio change speed). However, there is a risk of giving the user the impression of lowered response to zoom operations. Additionally, since the time until a zoom change finishes becomes longer according to the slowing down of the zoom magnification ratio change speed, the time required for zoom operations increases, which raises the risk of missing the timing for other shooting operations. Consequently, uniformly slowing down the zoom magnification ratio change speed is not realistic.

Accordingly, as an example in an embodiment of the present disclosure, as indicated by the solid line in FIG. 1, for a main image, the zoom magnification ratio change speed is slowed down and set to accelerate and decelerate smoothly, and an image in which the zoom has been controlled by the zoom magnification ratio indicated by the solid line is obtained. This image may be recorded as appropriate. On the other hand, for the image displayed on a device such as viewfinder or an LCD monitor during shooting, there is displayed an image in which the zoom has been controlled by a zoom magnification ratio reflecting the user's zoom operations (a zoom magnification ratio which is the same as, or which approximates, the zoom magnification ratio indicated by the dashed line). Hereinafter, multiple embodiments of the present disclosure will be described in detail.

Note that the zoom magnification ratio change speed in the following description is prescribed the change or the proportional change of the zoom magnification ratio, but is not limited thereto. For example, the zoom magnification ratio change speed may also be prescribed by the proportional change of the field of view, the proportional change of the focus distance, the proportional change of the position of the zoom lens, the amount of movement per unit time of the zoom lens, or the like.

For example, the dashed line in FIG. 1 expresses the state of change in the zoom magnification ratio obtained in response to zoom operations (hereinafter designated the target zoom magnification ratio where appropriate). The solid line in FIG. 1 expresses the state of change in a zoom magnification ratio controlled so that the input target zoom magnification ratio changes smoothly (hereinafter designated the main image zoom magnification ratio where appropriate). Additionally, the magnitude of the change in the slope of the dashed line in FIG. 1 is designated the target zoom magnification ratio change speed where appropriate, while the magnitude of the change in the slope of the solid line is designated the main image zoom magnification ratio change speed. Note that the zoom position refers to the lens position for shooting at a certain zoom magnification ratio. Zoom control is conducted so that the image presented to the user during shooting (monitoring image) is an image according to the target zoom magnification ratio. To conduct this zoom control, a monitoring image zoom magnification ratio is set. In the present disclosure, as an example, the completion of a main image zoom magnification ratio change operation is set to be later than the completion of a monitoring image zoom magnification ratio change operation.

1. First Embodiment

[Configuration of Imaging Device]

An embodiment of the present disclosure is an example of applying a zoom control device to an imaging device that includes a video imaging function. Specific examples of the imaging device may include devices such as a digital still camera, a digital video camera, a smartphone, a mobile phone, a remotely controllable robot, and a remotely controllable security camera. However, the content of the present disclosure is not limited to an example in which the zoom control device is built into the imaging device.

Figure 2:
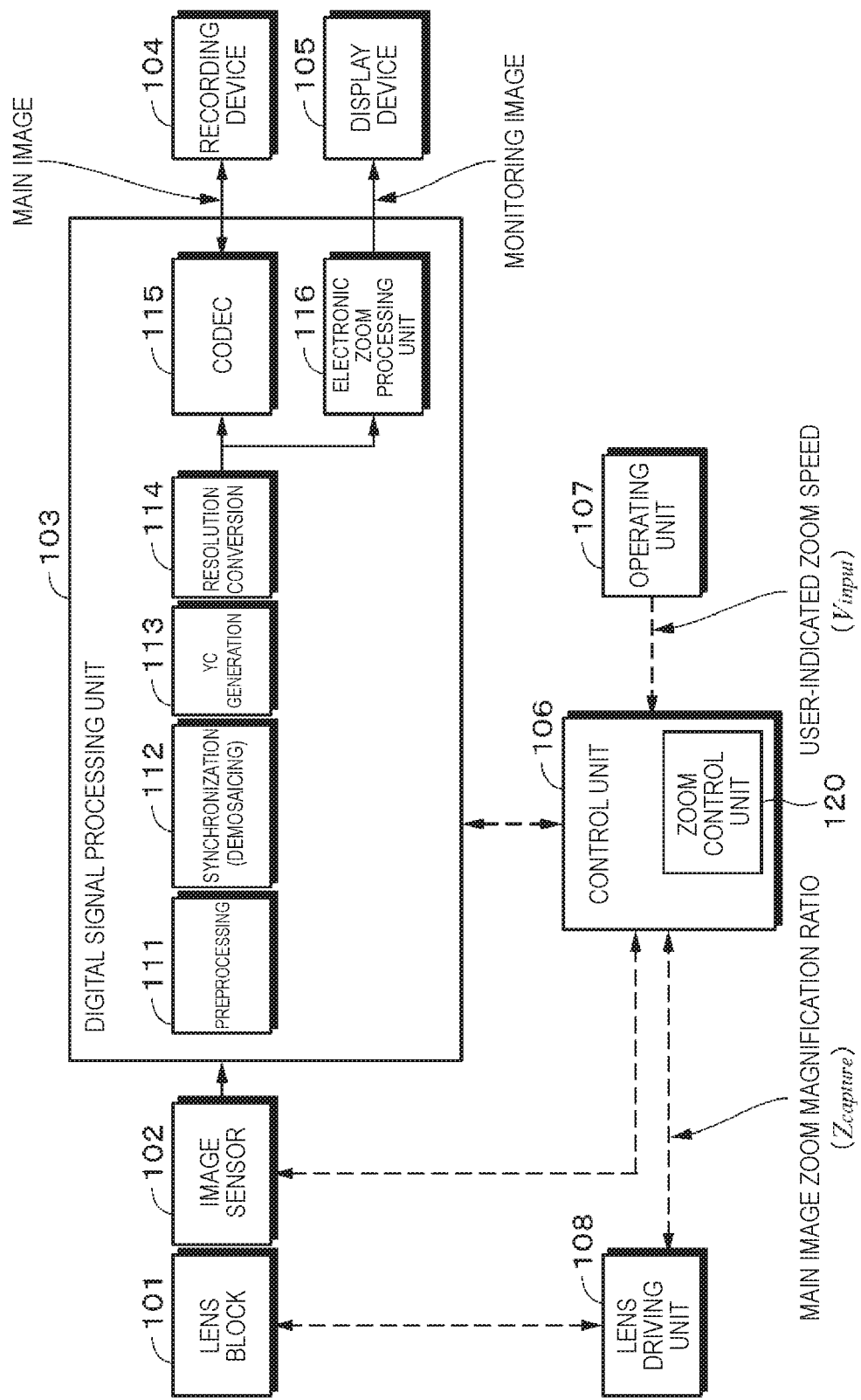
FIG. 2 is a block diagram illustrating an example of a configuration of an imaging device according to a first embodiment of the present disclosure.

FIG. 2 illustrates an example of the configuration of the imaging device. Note that the solid arrows in FIG. 2 indicate an example of the flow of image data, while the dashed arrows indicate an example of the flow of control signals and commands.

The imaging device 1 is equipped with a lens block 101, an image sensor 102, a digital signal processing unit 103, a recording device 104, a display device 105, a control unit 106, an operating unit 107, and a lens driving unit 108. The digital signal processing unit 103 is equipped with image processing function blocks, such as a preprocessing unit 111, a synchronization (demosaicing) unit 112, a YC generation unit 113, a resolution conversion unit 114, a codec unit 115, and an electronic zoom processing unit 116, for example. The control unit 106 includes, as one function block, a zoom control unit 120 corresponding to the zoom control device.

The lens block 101 is equipped with lenses such as a cover lens, a zoom lens, and a focus lens, as well as a diaphragm mechanism. Light from a subject is condensed onto the image sensor 102 through the lens block 101. The lens block 101 may also be an interchangeable lens that may be interchanged on the imaging device 1.

The image sensor 102 includes an image sensor, such as the charge-coupled device (CCD) type or the complementary metal-oxide-semiconductor (CMOS) type, for example. In the image sensor 102, processes such as a correlated double sampling (CDS), an automatic gain control (AGC) process, and an analog/digital (A/D) conversion process are performed on an electrical signal obtained by photoelectric conversion in the image sensor. An imaging signal converted into digital data is output from the image sensor 102 to the downstream digital signal processing unit 103.

The digital signal processing unit 103 is configured as an image processing processor by a large-scale integrated circuit (LSI circuit), a digital signal processor (DSP), or the like. The digital signal processing unit 103 executes various types of signal processing on digital image data supplied from the image sensor 102, according to control by the control unit 106, for example.

The preprocessing unit 111 performs processes on the digital image data from the image sensor 102, such as a clamping process that clamps the R, G, and B black levels to a certain level, and an interpolation process between each of the R, G, B, color channels. The synchronization unit 112 performs a color separation process to make the image data for each pixel have color components for all of red (R), green (G), and blue (B).

The YC generation unit 113 generates (separates) a luminance (Y) signal and a chrominance (C) signal from R, G, and B image data. The resolution conversion unit 114 executes a resolution conversion process on the image data that has been subjected to various types of signal processing. The image processing in the digital signal processing unit 103 is not limited to the processing discussed above. The digital signal processing unit 103 may also conduct known image processing different from the image processing given as an example herein.

The digital image data that has been subjected to image processing is input into each of the codec unit 115 and the electronic zoom processing unit 116. In the first embodiment, the image input into the codec unit 115 corresponds to the main image in which zoom control already has been performed by optical zoom. Meanwhile, the image input into the electronic zoom processing unit 116 corresponds to the monitoring image before zoom control is performed by optical zoom and before zoom control is performed by electronic zoom.

The codec unit 115 conducts a coding process for recording or transmission, for example, on the resolution-converted digital data. The codec unit 115 also conducts a decoding process on digital image data input from the recording device 104.

The electronic zoom processing unit 116 conducts an electronic zoom process on the input monitoring image, according to control by the control unit 106. For example, an electronic zoom process is conducted in which part of the monitoring image is cut out and enlarged by interpolating pixels, or reduced. Note that the content of the electronic zoom process is not limited to any particular content, insofar as the image is enlarged or reduced by signal processing.

The recording device 104 includes a driver that conducts a recording process on a recording device. The driver may conduct not only a recording process, but also a playback process of reading out data from a recording device. Note that the recording device may be one that is built into the imaging device 1, such as a hard disk, or one that is freely removable from the imaging device 1, such as semiconductor memory. Furthermore, the recording device 104 may also be separate from the imaging device 1. Digital image data may be transmitted between the imaging device 1 and the recording device 104 in a wired or wireless manner.

The display device 105 includes a driver. The driver conducts a display control corresponding to the type of monitor, and causes the monitor to display an image. The image may be a still image or a moving image. On the monitor, a monitoring image or a playback image, and a menu screen for configuring various modes and settings in the imaging device 1, are displayed. The monitor is made up of a liquid crystal display (LCD), organic electroluminescence (EL), or the like. The monitor of the display device 105 may also be configured as a touch panel and fulfill some of the functions of the operating unit 107. The monitor may also be display equipment that is connected to the imaging device 1 through an interface.

The control unit 106 is made up of a microprocessor, such as a central processing unit (CPU), for example, and controls each component of the imaging device 1. For example, the control unit 106 controls the lens driving unit 108 to thereby move the focus lens and the like to a certain position. Additionally, the control unit 106 supplies operation timings to the image sensor 102. Furthermore, the control unit 106 performs control according to an operating signal input from the operating unit 107, and as a result, the imaging device 1 operates according to user operations.

The control unit 106 includes the zoom control unit 120 as a function block. Note that in FIG. 2, the zoom control unit 120 is built into the control unit 106, but the control unit 106 and the zoom control unit 120 may also be configured by different CPUs or the like.

The zoom control unit 120 corresponds to a zoom magnification ratio change speed setting unit and a zoom control unit. The zoom control unit 120 sets the main image zoom magnification ratio and the monitoring image zoom magnification ratio according to zoom operations by the user. The monitoring image zoom magnification ratio is set based on the target zoom magnification ratio. Additionally, the zoom control unit 120 conducts zoom control on the main image with the main image zoom magnification ratio, and conducts zoom control on the monitoring image with the monitoring image zoom magnification ratio. The zoom control unit 120 holds the main image zoom magnification ratio change speed and the target zoom magnification ratio change speed as internal parameters, and these are set so that a main image zoom magnification ratio change operation is completed later than a monitoring image zoom magnification ratio change operation.

From a different perspective, the zoom control unit 120 corresponds to a main image zoom magnification ratio control unit and a monitoring image zoom magnification ratio control unit. The main image zoom magnification ratio control unit controls the optical zoom based on the main image zoom magnification ratio. The monitoring image zoom magnification ratio control unit, in addition to the optical zoom control by the main image zoom magnification ratio control unit, also sets an electronic zoom magnification ratio (to be discussed later in detail) and controls the electronic zoom.

The lens driving unit 108 is controlled by the zoom control unit 120, and the zoom lens is moved to a certain position according to this control. Consequently, optical zooming is performed on the main image and the monitoring image. Additionally, the zoom control unit 120 sets a certain zoom magnification ratio for the electronic zoom processing unit 116. The zoom magnification ratio of the electronic zoom is set based on the difference between the zoom magnification ratio indicated by the dashed line and the zoom magnification ratio indicated by the solid line illustrated in FIG. 1, for example. As a result of the electronic zoom processing unit 116 according to the set zoom magnification ratio, electronic zooming is performed on the monitoring image. In other words, the zoom control on the monitoring image according to the first embodiment is a compound control made up of an optical zoom control, and an electronic zoom control on the image obtained according to the optical zoom control. Note that the detailed configuration of the zoom control unit 120 will be discussed later.

The operating unit 107 includes an input function of accepting user operations, and sends an operating signal corresponding to an input operation to the control unit 106. The operating signal is a digitized signal, for example. The operating unit 107 is realized by components such as various operating elements provided on the housing of the imaging device 1, and a touch panel formed in the display device 105, for example. The operating elements on the housing may be a playback menu launch button, an OK button, directional keys, a cancel button, a zoom key, a slide key, a shutter button (release button), and the like. The operating unit 107 may also be a remote control device capable of operating the imaging device 1 remotely.

According to operations on the zoom key, electrically-powered zooming is performed, for example. On the zoom key, slide operations in the up-and-down direction or the left-and-right direction are possible. One of the two directions is set to the telephoto (T) side, while the other is set to the wide-angle (W) side. The user of the imaging device 1 is able to give an instruction to increase the zoom magnification ratio by sliding the zoom key to the telephoto side, and is able to give an instruction to decrease the zoom magnification ratio by sliding the zoom key to the wide-angle side, for example. Note that the zoom key is not limited to a mechanical key. For example, instructions to increase or decrease the zoom magnification ratio may also be given according to touch operations on the touch panel, or instructions to increase or decrease the zoom magnification ratio may also be given by voice.

Examples of the zoom driving method include the fixed-step method and the continuous method. The fixed-step method refers to a method in which several zoom magnification ratios are fixed in advance, such as the five fixed zoom magnification ratios of actual size ($\times 1$), $\times 1.4$, $\times 2$, $\times 3$, $\times 4$, and $\times 5$ being available, for example, and the zoom lens is driven by the lens driving unit 108 in accordance with the fixed zoom magnification ratio.

The continuous method refers to a method in which the zoom lens is driven by the lens driving unit 108 so that the zoom magnification ratio varies continuously from a lower-limit value to an upper-limit value. In this case, the lower-limit value of the zoom magnification ratio is pre-associated with the lower-limit position on the movable range of the zoom key, while the upper-limit value of the zoom magnification ratio is pre-associated with the upper-limit position. Specifically, for example, the lower-limit value of the zoom magnification ratio is taken to be actual size ($1\times$), while the upper-limit value of the zoom magnification ratio is taken to be $5\times$. In this case, for example, the respective values obtained by dividing the range of the zoom magnification ratio from $1\times$ to $5\times$ into 100 equal divisions are associated with the respective positions obtained by dividing the movable range of the zoom key into 100 equal divisions. In this way, when the continuous method is adopted, the respective values of the zoom magnification ratio are mapped into the movable range of the zoom key. In the description hereinafter, the continuous method is described as being the zoom driving method, but the zoom driving method is not limited thereto.

The zoom control unit 120 periodically monitors operations on the zoom key (such as the operation direction and the operation strength or operation magnitude), for example. The period does not necessarily match the frame rate, and may be set according to the specifications of the system. In the case of optical zoom, the zoom lens is driven at a movement speed according to the operation. For example, if the zoom key is long-pressed to the telephoto side, the zoom lens is displaced at a fast movement speed. For this reason, the image is displayed to be enlarged suddenly. Note that the boundary (upper limit) of the movement speed of the zoom lens is different depending on the imaging device. In the case of electronic zoom, a process of enlarging the displayed image according to the operation is conducted. For example, if the zoom key is long-pressed to the telephoto side, electronic zooming is conducted every 10 frames. For this reason, the image is displayed to be enlarged suddenly. Note that the above example is merely one example, and the way in which to conduct a zoom process according to a zoom operation may be modified as appropriate.

The lens driving unit 108 includes a driving mechanism such as a stepping motor that drives the zoom lens and the like. The lens driving unit 108 moves the zoom lens to a certain position in accordance with control by the zoom control unit 120, for example. Note that the lens driving unit 108 may also be configured to include a microprocessor. Additionally, the microprocessor of the lens driving unit 108 may communicate with the control unit 106, and zoom lens position information and the like may be supplied from the lens driving unit 108 to the control unit 106, for example. The control unit 106 computes the difference from the displaced position of the zoom lens based on the zoom lens position information, and controls the lens driving unit 108 to displace the zoom lens in a certain direction and with a suitable amount of movement, for example.

The above thus describes an example of the configuration of the imaging device 1. Obviously, components different from the components given as an example may be added to the imaging device 1, and some of the above components may also be separate from the imaging device 1.

For example, an external input/output terminal may also be provided on the imaging device 1. The imaging device 1 is connected to an external display device, such as a television set or a personal computer, for example, through the external output terminal. A video or the like recorded by the imaging device 1 may be displayed on the external display device.

The imaging device 1 may also be provided with a communication unit able to connect to a network such as the Internet. Additionally, the imaging device 1 may also be provided with a communication unit that conducts short-range wireless communication with external equipment. The imaging device 1 may also be provided with a sensor such as a gyro sensor, and may be configured to be able to identify the directions in which the imaging device 1 moves (movement in the pan direction and movement in the tilt direction) from information obtained by the sensor.

[Configuration of Zoom Control Device]

Figure 3:
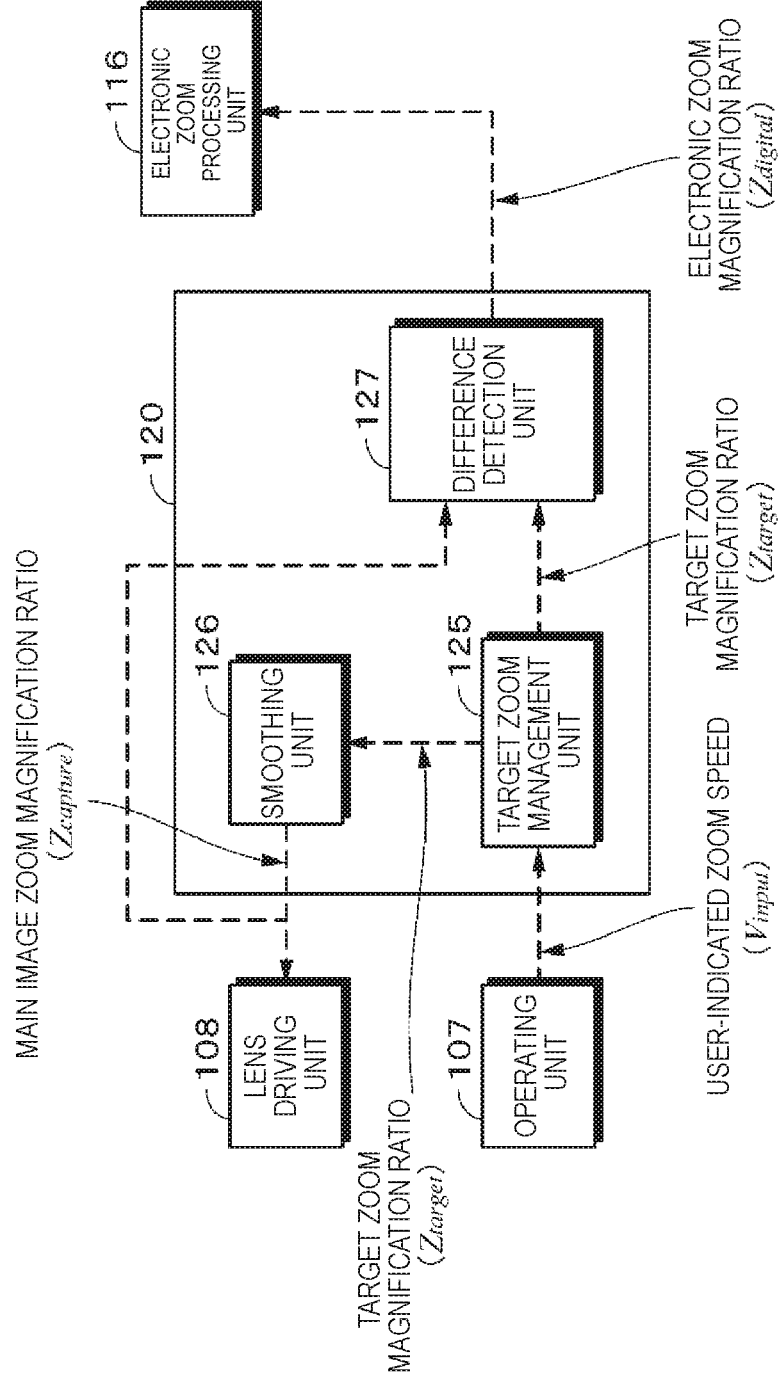
FIG. 3 is a diagram for explaining an example of a configuration of a zoom control unit.

FIG. 3 is a diagram for explaining an example of a configuration of the zoom control unit 120, which is an example of a zoom control device. The zoom control unit 120 is equipped with a target zoom management unit 125, a smoothing unit 126, and a difference detection unit 127, for example.

An operating signal based on a zoom operation performed using the operating unit 107 is input into the target zoom management unit 125. The target zoom management unit 125 computes a zoom magnification ratio change speed corresponding to the operating signal, and holds this zoom magnification ratio change speed as the target zoom magnification ratio change speed. The target zoom management unit 125 supplies the target zoom magnification ratio change speed to the smoothing unit 126 and the difference detection unit 127.

The smoothing unit 126 is made up of a low-pass filter (LPF), specifically a finite impulse response (FIR) filter, for example. In the case in which the smoothing unit 126 is made up of an FIR filter, the coefficients of the FIR filter correspond to an example of parameters for the smoothing process. In the first embodiment, the coefficients of the FIR filter are fixed.

The smoothing unit 126 obtains a smoothed target zoom magnification ratio change speed by smoothing the target zoom magnification ratio change speed, and obtains the main image zoom magnification ratio by adding, to the main image zoom magnification ratio, a value obtained by multiplying the smoothed zoom magnification ratio change speed by a control unit time. The smoothing unit 126 supplies the main image zoom magnification ratio to the difference detection unit 127. Additionally, the smoothing unit 126 conducts zoom control on the lens driving unit 108 according to the main image zoom magnification ratio. According to this zoom control, the lens driving unit 108 displaces the zoom lens to perform optical zooming.

The difference detection unit 127 obtains an electronic zoom magnification ratio based on the target zoom magnification ratio and the main image zoom magnification ratio. The difference detection unit 127 computes the difference between the target zoom magnification ratio and the smoothed target zoom magnification ratio, and decides the electronic zoom magnification ratio to compensate for this difference, for example. In addition, the monitoring image is always displayed at the target zoom magnification ratio, regardless of the state of the main image zoom magnification ratio. The difference detection unit 127 supplies the monitoring image zoom magnification ratio change speed to the electronic zoom processing unit 116, and conducts zoom control on the monitoring image. According to this control, the electronic zoom processing unit 116 executes electronic zooming on the monitoring image.

Since the main image zoom magnification ratio is set so that the zoom magnification ratio varies smoothly by the work of the smoothing unit 126, the image obtained through the optical zooming zooms in or zooms out on the subject smoothly. Consequently, even when the image is played back, the subject is not zoomed in or zoomed out suddenly, and a sense of discomfort in a user viewing the image may be prevented. With respect to the target zoom magnification ratio according to zoom operations by the user (for example, the dashed line illustrated in FIG. 1), the actual optical zooming becomes the main image zoom magnification ratio (for example, the solid line illustrated in FIG. 1). The electronic zoom magnification ratio is set to a value in a direction to compensate for the difference between the two, or in other words, to cancel out the smoothing. For this reason, an image reflecting zooming based on the actual zoom operations may be provided to the user while shooting.

[Operation of Smoothing Unit]

An example of the operation of the smoothing unit 126 will be described specifically. Note that in the following formulas, V represents speed, while Z represents the position of the zoom lens. Also, the values of V and Z are expressed in a logarithmic representation. The smoothing unit 126 performs the computation expressed by the following Math. 1, for example.

$$V_{stabilized} = f(Z_{target}, Z_{capture}) \times \max\left( LPF(V_{input}), \frac{Z_{target} - Z_{capture}}{kT}, \varepsilon \right)$$ [Math. 1]

In Math. 1, Vstabilized means the stabilized speed, and represents the main image zoom magnification ratio change speed. f(Ztarget, Zcapture) represents a deceleration coefficient. LPF(Vinput) is the result of applying the LPF to the target zoom magnification ratio change speed according to the user's zoom operations, and smoothing the change of speed. ε is a constant of small value, used so that the zoom speed does not become too slow. kt is a constant for computing the zoom speed from the difference between the target zoom magnification ratio and the main image zoom magnification ratio. Ztarget is the target zoom magnification ratio corresponding to the user operations, and corresponds to the solid line in FIG. 1. Zcapture represents the current zoom lens position (or the zoom magnification ratio obtained at that position).

Figure 4:
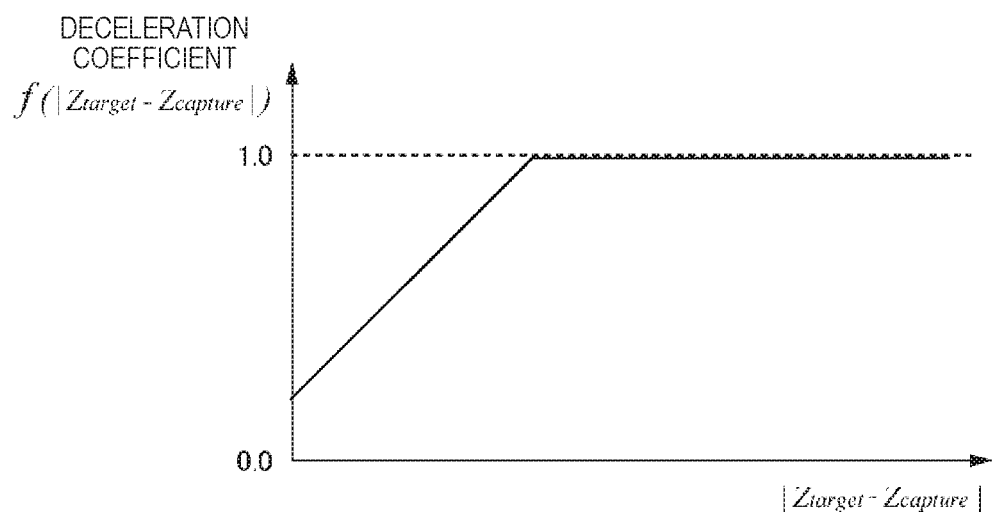
FIG. 4 is a diagram for explaining an example of a process by a smoothing processing unit.

FIG. 4 is a diagram for explaining an example of a deceleration coefficient. In FIG. 4, the horizontal axis represents the absolute value of the difference between Ztarget and Zcapture (|Ztarget−Zcapture|), while the vertical axis represents an example of the deceleration coefficient. As the absolute value (|Ztarget−Zcapture|) becomes smaller, f(Ztarget, Zcapture) is set to be small. When the absolute value (|Ztarget−Zcapture|) becomes a certain value or greater, f(Ztarget, Zcapture) is set to 1.

In other words, when the difference between the target zoom magnification ratio and the zoom magnification ratio obtained by the current position of the zoom lens is small, f(Ztarget, Zcapture) becomes small, and thus the zoom change speed decelerates, decelerating smoothly to a stop at the target position. When the difference between the target zoom magnification ratio and the zoom magnification ratio obtained by the current position of the zoom lens is large, f(Ztarget, Zcapture) approaches 1, and thus the deceleration effect does not engage.

Note that when there are no zoom operations by the user, the value of LPF(Vinput) becomes 0, and if there is no ε, the value of Vstabilized becomes 0. In other words, the zoom lens stops. By setting ε, the zoom lens may be prevented from stopping, and the zoom lens may be displaced to the position corresponding to the target zoom magnification ratio.

Note that a limit (Vlimit) may also be applied to Vstabilized as expressed in Math. 2 below, so that the driving speed of the zoom lens does not exceed the capability of the lens driving unit 108, or so that zooming is not conducted at an excessive speed leading to discomfort during viewing.

$$V_{output} = \begin{cases} V_{stabilized}, & V_{stabilized} < V_{limit} \\ V_{limit}, & V_{stabilized} \geq V_{limit} \end{cases} \quad [\text{Math. 2}]$$

If Vstabilized is less than Vlimit, Vstabilized is output as Voutput. If Vstabilized is equal to or greater than Vlimit, Vlimit is output as Voutput.

The smoothing unit 126 additionally computes the specific position of the zoom lens according to Math. 3 below.

$$Zupdate = Zcapture + Voutput \times T \quad [\text{Math. 3}]$$

In Math. 3, Zupdate represents the position of the zoom lens in the next control cycle (for example, the next frame), while Zcapture represents the position of the zoom lens in the current control cycle (for example, the current frame). T represents the control interval, and represents the frame rate (more specifically, 1/60), for example. The speed is converted into a position by multiplying Voutput by T, and an update value is obtained. By adding this update value to the current zoom lens position, the position of the zoom lens in the next frame is computed, and optical zooming is conducted according to the new zoom magnification ratio. The smoothing unit 126 outputs Zupdate to the lens driving unit 108, and the lens driving unit 108 controls the zoom position of the zoom lens to match the magnification ratio expressed by Zupdate.

Figure 5:
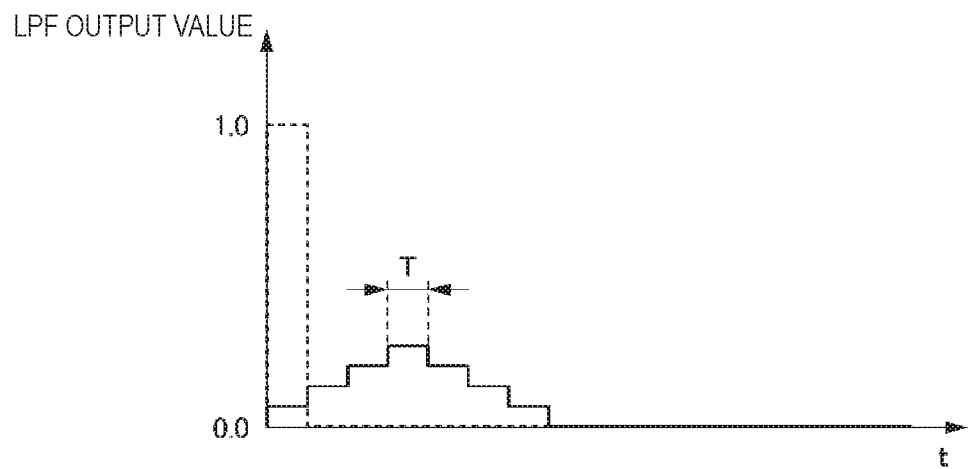
FIG. 5 is a diagram for explaining an example of the impulse response of a low-pass filter.

FIG. 5 illustrates an example of the filter process LPF (Vinput) impulse response of the smoothing unit 126. As discussed earlier, the smoothing unit 126 is made up of a digital filter (FIR filter), for example. In FIG. 5, the dashed line schematically represents the impulse response in the case of not applying the LPF. The output when the LPF is applied to this impulse response is illustrated schematically by the solid line in FIG. 5. Note that the horizontal widths of the solid line in FIG. 5 correspond to the control interval (T in Math. 2).

[Process Flow]

Figure 6:
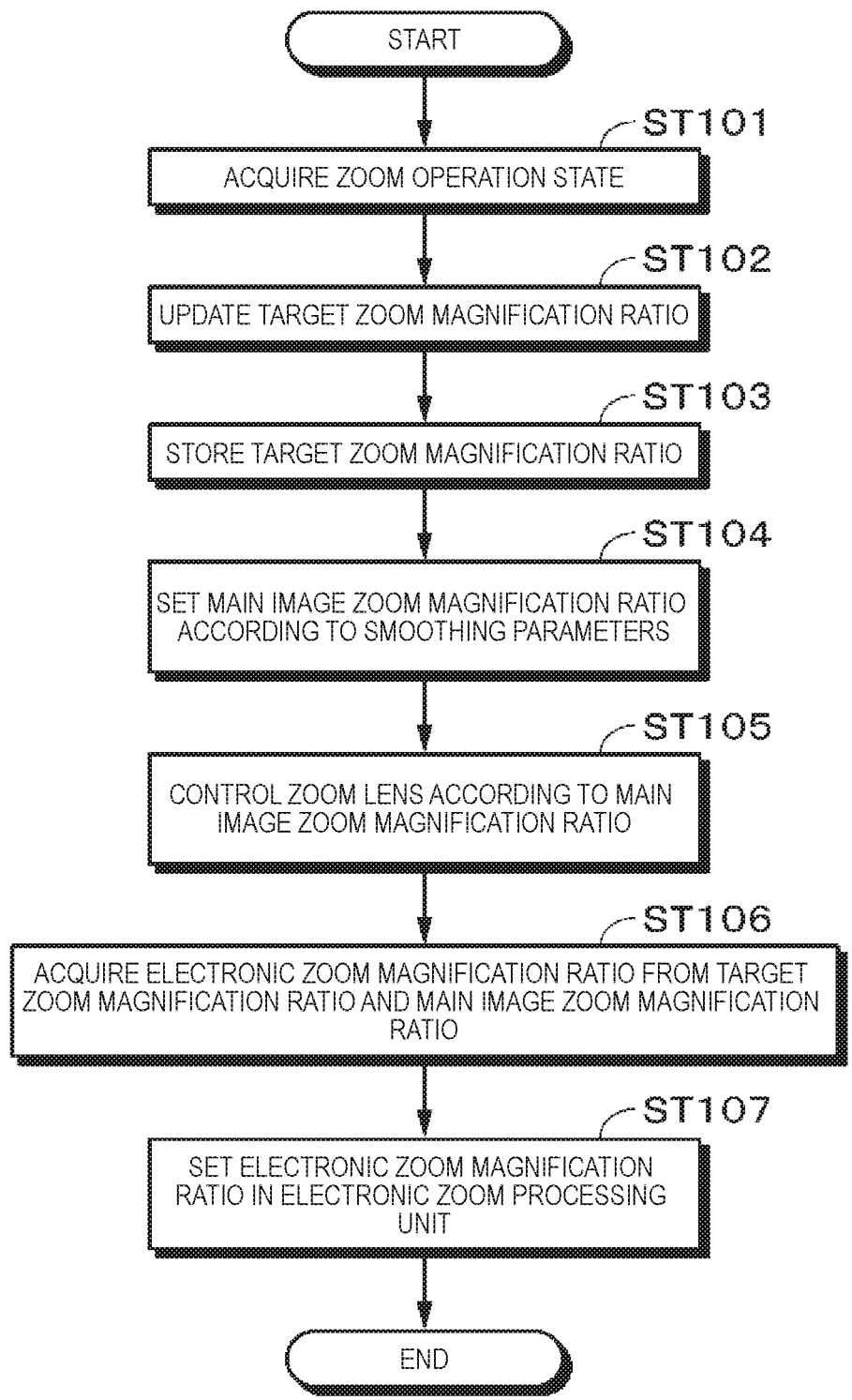
FIG. 6 is a flowchart illustrating an example of the flow of a process according to a first embodiment of the present disclosure.

FIG. 6 is a flowchart illustrating an example of the flow of processes according to the first embodiment. Note that each process described hereinafter is executed by the zoom control unit 120, unless specifically indicated otherwise. FIG. 6 illustrates processes in certain control interval units.

In step ST101, input via the zoom key in the operating unit 107 is monitored, and the zoom operation state is acquired. The zoom control unit 120 acquires the zoom operation state on a certain period, for example. Subsequently, the process proceeds to step ST102.

In step ST102, the target zoom magnification ratio is updated according to the zoom operation. FIG. 7 is a diagram for explaining an example of a target zoom magnification ratio update process, and is an example in which the process of step ST102 is realized by hardware. For example, the update value of the zoom magnification ratio corresponding to the zoom operation is input. In memory 132, the target zoom magnification ratio from the previous process is stored. A multiplier 130 multiplies the previous target zoom magnification ratio by the update value, and an updated target zoom magnification ratio is obtained. Note that since the position of the zoom lens has boundary positions called the wide end and the tele end, a limiter 132 sets limits so the zoom lens does not exceed the boundary positions.

The description now returns back to FIG. 6. In step ST103, the target zoom magnification ratio is stored. If the target zoom magnification ratio was updated, the updated target zoom magnification ratio is stored, whereas if the target zoom magnification ratio was not updated, the previous target zoom magnification ratio is stored. Subsequently, the process proceeds to step ST104.

In step ST104, a smoothing process is conducted on the target zoom magnification ratio, and a smoothed target zoom magnification ratio is obtained. The smoothed target zoom magnification ratio is set as the main image zoom magnification ratio. Subsequently, the process proceeds to step ST105.

In step ST105, zoom control is performed to displace the zoom lens to a position corresponding to the main image zoom magnification ratio. This control is conducted on the lens driving unit 108 from the zoom control unit 120. According to this control, the lens driving unit 108 moves the zoom lens to a certain position. Subsequently, the process proceeds to step ST106.

In step ST106, a process of setting an electronic zoom magnification ratio is conducted. The electronic zoom magnification ratio is set a value according to the difference between the target zoom magnification ratio and the smoothed, and in the direction that cancels out the smoothing, for example. Subsequently, the process proceeds to step ST107.

In step ST107, zoom control is conducted to set the electronic zoom magnification ratio in the electronic zoom processing unit 116. The electronic zoom processing unit 116 electronically zooms the monitoring image at the set electronic zoom magnification ratio. The monitoring image that has been optically zoomed according to the main image zoom magnification ratio and electronically zoomed according to the electronic zoom magnification ratio is displayed on the display device 105.

Note that the periods by which the respective processes are conducted are not necessarily the same, and may be different. For example, the period of monitoring the presence or absence of the input of a zoom operation and the period of setting the main image zoom magnification ratio and the electronic zoom magnification ratio may be different.

As described above, in the first embodiment, an image in which the subject is enlarged/reduced smoothly may be obtained. This image may be recorded to a recording device as appropriate. When playing back the recorded image, since the subject is enlarged/reduced smoothly, it is possible to prevent the users from feeling a sense of discomfort or unnaturalness. In addition, even if the user is a novice, the user is able to obtain an image in which zoom operations are performed like an expert. On the other hand, since an image reflecting the user's zoom operations is displayed during the zoom operations, it is possible to prevent the user from feeling that usability is poor.

2. Second Embodiment

Next, a second embodiment will be described. For the configuration of the zoom control device according to the second embodiment, the configuration of the zoom control device described in the first embodiment may be applied, unless specifically indicated otherwise. This applies similarly to the configuration of the imaging device. Like components and processes will be denoted with like reference signs. Also, unless specifically indicated otherwise, the matter described in the first embodiment is applicable to the second embodiment.

In the first embodiment discussed above, the smoothing parameters that the smoothing unit 126 uses in the smoothing process are fixed. In the second embodiment, depending on the imaging conditions, the smoothing parameters are changed, and the degree of smoothing is changed. As the degree of smoothing increases, the magnitude of the effect produced by smoothing increases. Note that the degree of smoothing may be adjusted by changing the coefficients of the FIR filter, for example. If the coefficients are assigned to yield a low-pass filter having a low cutoff frequency, the degree of smoothing may be increased, whereas if the coefficients are assigned to yield a low-pass filter having a high cutoff frequency, the degree of smoothing may be decreased.

The imaging conditions may be, for example, the operational conditions of the imaging device 1, the conditions of user operations on the imaging device 1, and the imaging mode set in the imaging device 1. The degree of smoothing may be, for example, whether the smoothing process is on/off, "large", in which a strong smoothing process is applied, and "small", in which a weak smoothing process is applied. Obviously, these degrees are merely an example, and the degree of smoothing may also be set to a greater number of levels. The smoothing parameters (for example, the coefficients of the FIR filter) corresponding to the degree of smoothing may be set as appropriate.

[Degree of Smoothing according to Imaging Conditions]

FIG. 8 illustrates an example of the degree of smoothing according to imaging conditions. The "recording state" may be given as an example of the operational conditions of the imaging device 1. When the "recording state" is "recording", the smoothing process is conducted (on) to raise the quality of the recorded image. When the "recording state" is "standing by to record", the smoothing process is not conducted (off) to simplify processing and improve system response. Note that the "standing by to record" state is a state in which the monitoring image is displayed on the display unit, but the main image is not recorded.

The "current position of the zoom lens" may be given as an example of the operational conditions of the imaging device 1. When the "current position of the zoom lens" is positioned at the end (on either the tele side or the wide side), the smoothing process is not conducted (off) so that the zoom lens does not move past the end.

The "movement conditions of the imaging device 1" may be given as an example of the operational conditions of the imaging device 1. The "movement conditions of the imaging device 1" are, for example, the movement speed in the pan direction or the tilt direction, and may be acquired by a sensor such as a gyro sensor. The configuration is not limited to a physical sensor, and the movement speed of the imaging device 1 may also be acquired based on image signal processing. When the movement speed of the imaging device 1 is a fast, the user is considered to be performing intense camera work intentionally, and thus the degree of smoothing is set to "small". The smoothing process may also not be conducted.

The "vibration magnitude of the imaging device 1" may be given as an example of the conditions of user operations on the imaging device 1. The "vibration magnitude of the imaging device 1" may be acquired by using a gyro sensor or the like. When the "vibration magnitude of the imaging device 1" is "large", there is a possibility that the user is performing intense camera work intentionally, and thus the degree of smoothing is set to "small". The smoothing process may also not be conducted. On the other hand, when the "vibration magnitude of the imaging device 1" is "small", the degree of smoothing is set to normal or "large" to raise the quality of the recorded image.

A "user indication for a fast zoom operation method" may be given as an example of the conditions of user operations on the imaging device 1. The "zoom operation method" includes a normal zoom operation method, and a fast zoom operation method that moves the zoom faster compared to the normal zoom operation method. Which zoom operation method is indicated by the user may be detected by providing a pressure sensor on the zoom key, for example. When the fast zoom operation method is indicated by the user, the degree of smoothing is set to "small" and Vlimit is set to a larger value, so that the speed of the zoom lens becomes the maximum speed or a speed close to the maximum.

A "normal imaging mode", an "overcrank imaging mode", an "undercrank imaging mode", a "landscape mode", a "night mode", a "sports mode", and a "frame rate setting" may be given as examples of the imaging mode of the imaging device 1. "Landscape mode" and the "night mode" are examples of static image imaging modes that image a static image. "Sports mode" is an example of a dynamic image imaging mode that images a dynamic image. With the "undercrank imaging mode", changes in zoom appear faster than actual when viewing the image, and thus the degree of smoothing is set to "large" compared to the "normal imaging mode". On the other hand, with the "overcrank imaging mode", changes in zoom appear slower than actual when viewing the image, and thus the degree of smoothing is set to "small" compared to the "normal imaging mode".

In the case of "landscape mode", the motion of the imaging device 1 is considered to be small. For this reason, the degree of smoothing is set to "large" to raise the quality of the recorded image. In the case of "night mode", the degree of smoothing is set to "large", for reasons similar to "landscape mode". In the case of "sports mode", it is considered that the imaging device 1 is subjected to large movements intentionally. Accordingly, the degree of smoothing is set to "small".

When the "frame rate" is low, the exposure time is long, and thus blur due to zooming occurs more readily. Accordingly, the movement speed of the zoom lens is limited to a slower speed, and in addition, the degree of smoothing is set to "large" to increase the amount of smoothing. In this way, the degree of smoothing may be varied according to the imaging conditions.

Smoothing parameters corresponding to respective imaging conditions are stored in memory as a table, for example. The zoom control unit 120 acquires the smoothing parameters corresponding to the imaging mode by reading the table. The zoom control unit 120 may also be configured to find the smoothing parameters corresponding to the imaging mode by computation. A configuration enabling smoothing parameters to be acquired externally through a network or the like is also acceptable.

[Process Flow]

Figure 9:
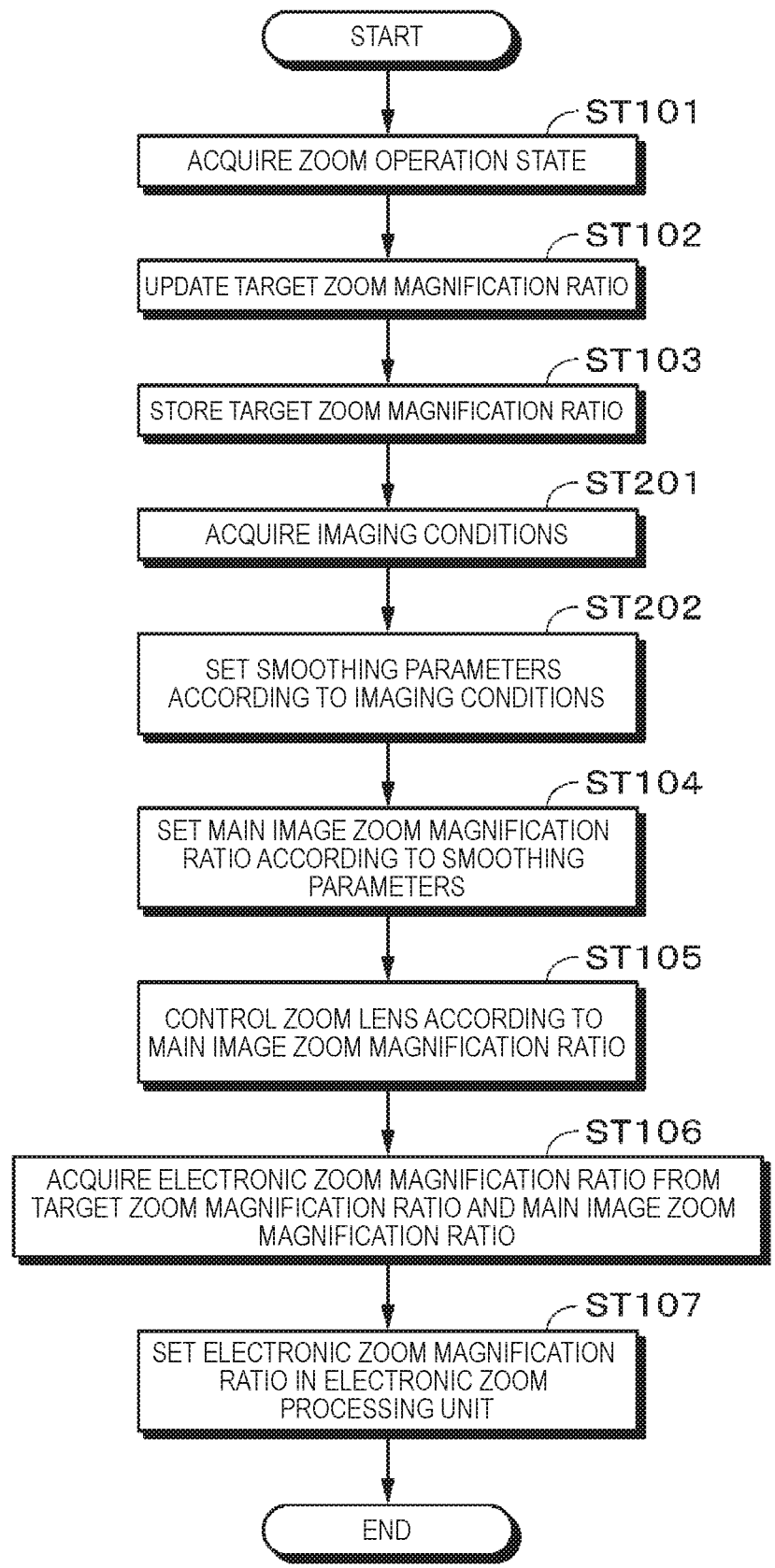
FIG. 9 is a flowchart illustrating an example of the flow of a process according to a second embodiment of the present disclosure.

FIG. 9 is a flowchart illustrating an example of the flow of a process according to the second embodiment. Hereinafter, the points that differ from the process flow of the first embodiment will be described primarily.

In the process according to the second embodiment, the processes of step ST201 and step ST202 are added. In step ST201, the imaging conditions are acquired. The zoom control unit 120 acquires the imaging conditions from input into the operating unit 107 and the like. Subsequently, the process proceeds to step ST202.

In step ST202, smoothing parameters are set according to the imaging conditions. For example, the coefficients of the FIR filter are set to suitable values according to the imaging conditions. Subsequently, the process proceeds to step ST104.

In step ST104, a smoothing process is conducted with the smoothing parameters set in step ST202, and the main image zoom magnification ratio is set. Since the other processes are similar to the first embodiment, duplicate description will be omitted.

As above, according to the second embodiment, a smoothing process may be conducted to a suitable degree according to the imaging conditions. For this reason, when the user is shooting with intense camera work, for example, it is possible to prevent the smoothing process from being conducted and an image different from the user's intended image from being generated.

3. Third Embodiment

Next, a third embodiment will be described. For the configuration of the zoom control device according to the third embodiment, the configuration of the zoom control device described in the first embodiment may be applied, unless specifically indicated otherwise. This applies similarly to the configuration of the imaging device. Like components and processes will be denoted with like reference signs. Also, unless specifically indicated otherwise, the matter described in the first and second embodiments is applicable to the third embodiment. In the third embodiment, an electronic zoom magnification ratio accounting for process delay is set by conducting a synchronization process.

Figure 10:
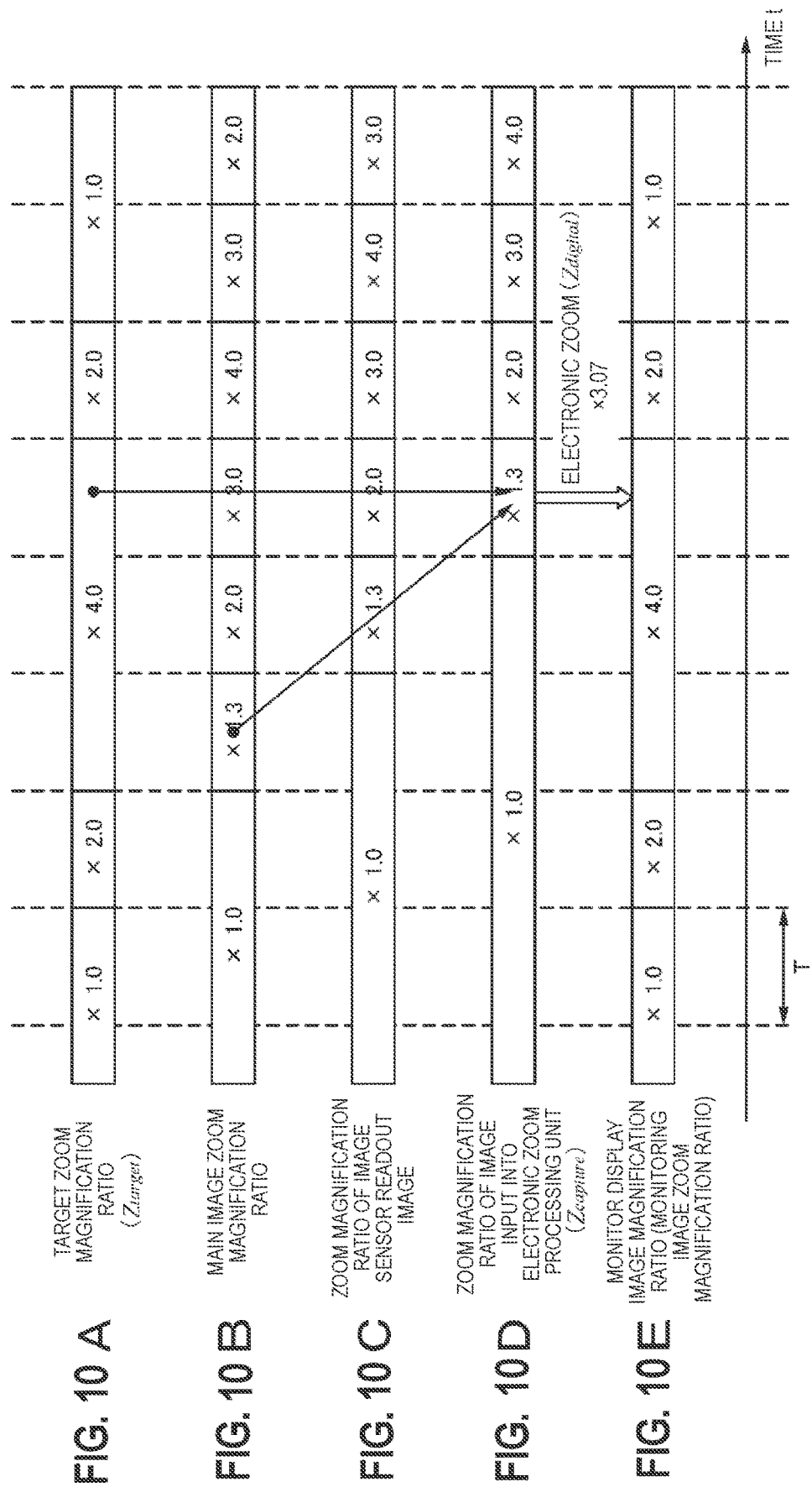
FIGS. 10A to 10E are diagrams for explaining a synchronization process according to a third embodiment of the present disclosure.

FIG. 10 is a diagram for explaining an example in which an electronic zoom magnification ratio accounting for process delay is set. The interval T between the dashed lines is the control interval, and is the screen update interval, for example.

FIG. 10A illustrates the target zoom magnification ratio corresponding to the user's zoom operations. FIG. 10B illustrates the main image zoom magnification ratio. When obtaining the main image zoom magnification ratio, since a smoothing process is performed on the target zoom magnification ratio and mechanical operations for driving the zoom lens are conducted, a corresponding delay is produced. In FIG. 10B, an illustration accounting for this delay is shown.

FIG. 10C illustrates the zoom magnification ratio of the readout image from the image sensor 102. From the radiation of light onto the image sensor 102 until the acquisition of image data, a delay corresponding to the exposure time of the image sensor 102 is produced. In FIG. 10C, an illustration accounting for the delay described in FIG. 10B as well as the delay corresponding to the exposure time of the image sensor 102 is shown.

FIG. 10D illustrates the zoom magnification ratio of the image input into the electronic zoom processing unit 116. At this point, a delay corresponding to the processing by the digital signal processing unit 103 is produced. In FIG. 10, an illustration accounting for the delay described in FIGS. 10B and 10C as well as the delay corresponding to the processing by the digital signal processing unit 103 is shown. FIG. 10E is the magnification ratio of the image displayed on the display device 105.

FIGS. 10A to 10E will be used to describe an example of a synchronization process specifically. The zoom key is operated by the user. Suppose that the target zoom magnification ratio corresponding to the zoom key operation is a magnification ratio of 2 (×2.0) (FIG. 10A). A smoothing process is conducted on the target zoom magnification ratio, and as the main image zoom magnification ratio, a magnification ratio of 1.3 (×1.3) is obtained, for example (FIG. 10B). Subject light taken in at the zoom lens position with an optical zoom magnification ratio of 1.3 irradiates and exposes the image sensor 102 (FIG. 10C). Image processing by the digital signal processing unit 103 is conducted on the image data output from the image sensor 102 (FIG. 10D).

In the case of not accounting for the delay produced by the processes so far, it is sufficient for the electronic zoom magnification ratio of the electronic zoom processing unit 116 to approach the target zoom magnification ratio of 2.0. However, in some cases, additional zoom operations may be performed while a delay is produced, and the target zoom magnification ratio may change from 2.0. In FIG. 10A, an example is illustrated in which the target zoom magnification ratio changes from 2.0 to 4.0 (×4.0). Accordingly, the electronic zoom magnification ratio is set to approach the target zoom magnification ratio of 4.0. Specifically, the electronic zoom magnification ratio is set to 3.07 (4.0/1.3).

[Process Flow]

Figure 11:
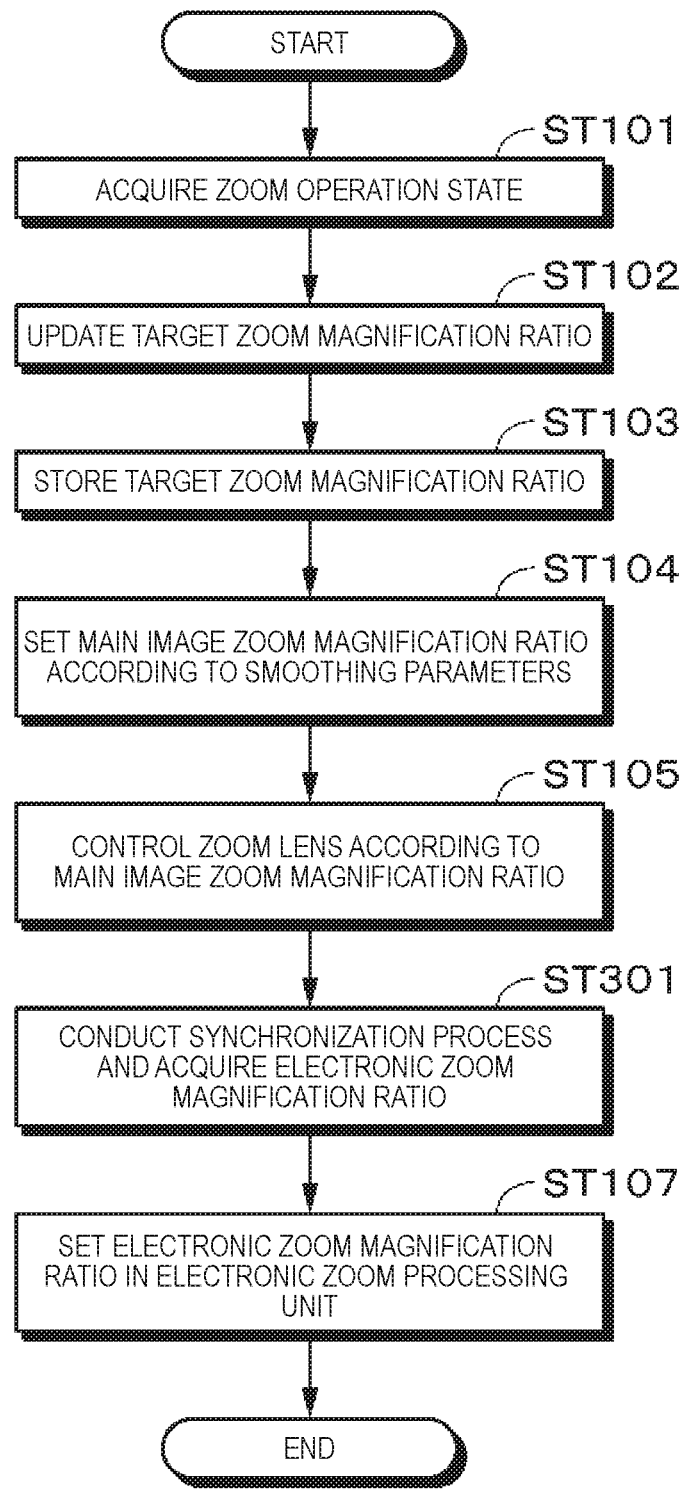
FIG. 11 is a flowchart illustrating an example of the flow of a process according to a third embodiment of the present disclosure.

FIG. 11 is a flowchart illustrating an example of the flow of a process according to the third embodiment. Hereinafter, the points that differ from the process flow of the first embodiment will be described primarily.

In step ST301, the synchronization process is conducted and the electronic zoom magnification ratio is set. In step ST107, the electronic zoom magnification ratio set in step ST301 is set in the electronic zoom processing unit 116. The electronic zoom processing unit 116 conducts electronic zooming according to the set electronic zoom magnification ratio. Since the other processes are similar to the processes in the first embodiment, duplicate description will be omitted.

As above, according to the third embodiment, an image that correctly reflects a zoom magnification ratio corresponding to the user's zoom operations may be obtained. Furthermore, the user is able to check the image that correctly reflects the zoom magnification ratio corresponding to the zoom operations.

4. Fourth Embodiment

Next, a fourth embodiment will be described. For the configuration of the zoom control device according to the fourth embodiment, the configuration of the zoom control device described in the first embodiment may be applied, unless specifically indicated otherwise. This applies similarly to the configuration of the imaging device. Like components and processes will be denoted with like reference signs. Also, unless specifically indicated otherwise, the matter described in the first, second, and third embodiments is applicable to the fourth embodiment.

As discussed above, in the first to the third embodiments, the field of view of the main image and the field of view of the monitor display are made to be different. Described specifically using FIG. 1, the monitoring image displayed on the display device 105 is an image in which the subsequently is zoomed in or zoomed out suddenly to reflect the user's zoom operations, like from the image M1, to the image M2, to the image M3. On the other hand, the image recorded to the recording device 104 is an image in which the subject is zoomed in (or zoomed out) smoothly, like from the image M1, to the image M4, to the image M3. Since there is a difference between the displayed image and the recorded image, there is a risk of the user being unable to grasp the extent of what is being recorded with only the monitoring image. For this reason, there is a possibility that an object not visible on the screen may be recorded, for example. The fourth embodiment is an embodiment devised in light of this point.

The zoom control unit 120 sets the monitoring image zoom magnification ratio based on Math. 4 below, for example.

$$Zdigital = Ztarget - Zcapture \qquad [\text{Math. 4}]$$

In Math. 4, Ztarget represents the target zoom magnification ratio. Zcapture represents the zoom magnification ratio obtained at the current zoom lens position (the zoom magnification ratio obtained by optical zooming), or in other words, the zoom magnification ratio of the image input into the electronic zoom processing unit 116. Zdigital represents the electronic zoom magnification ratio with respect to the monitoring image. Note each value of Z is expressed in a logarithmic representation. As expressed in Math. 4, Zdigital is set according to the difference between Ztarget and Zcapture. In the first, second, and third embodiments discussed earlier, electronic zooming is conducted at the zoom magnification ratio expressed by Zdigital, regardless of the position in the screen. In the fourth embodiment, the zoom magnification ratio is changed according to the position in the screen.

For example, provided that $P(x\_in, y\_in)$ is a certain position of the main image before the electronic zoom process, and $P(x\_out, y\_out)$ is the position after the electronic zoom process, the position in the x-axis direction is expressed by Math. 5 below, while the position in the y-axis direction is expressed by Math. 6 below. Note that Zh in Math. 5 and Zv in Math. 6 represent the magnification ratio in the x-axis direction and the magnification ratio in the y-axis direction of Zdigital discussed above, respectively. The magnification ratio referred to herein is the magnification ratio of the distance from a reference point. The reference point may be set arbitrarily, but herein, the reference point is set in the center of the main image. At the reference point, $x\_in = y\_in = x\_out = y\_out = 0$.

$$x\_in = x\_out \div Zh \qquad [\text{Math. 5}]$$

$$y\_in = y\_out \div Zv \qquad [\text{Math. 6}]$$

Figure 12:
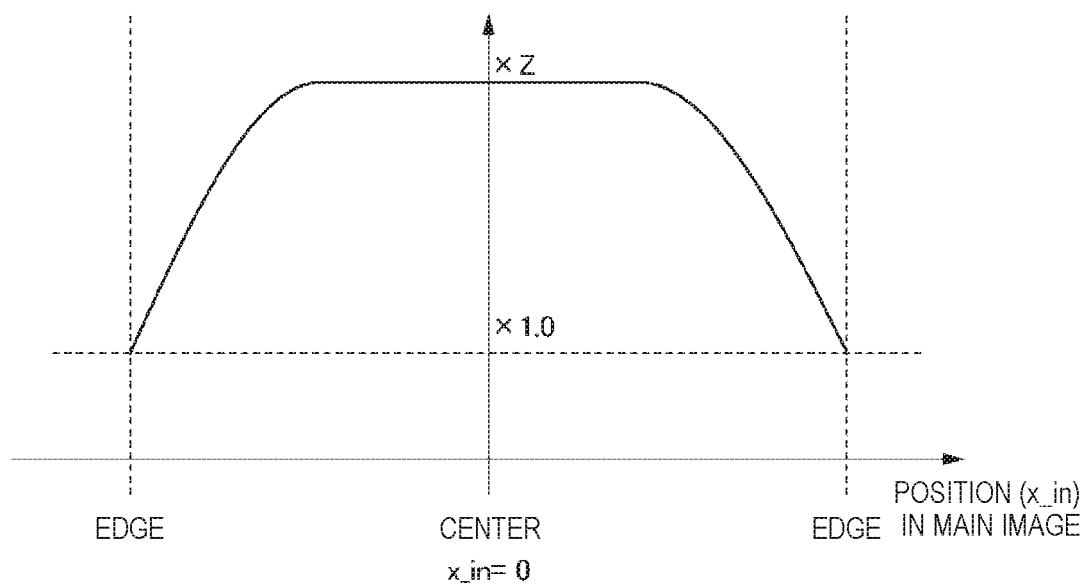
FIG. 12 is a diagram for explaining an example of the relationship between an in-image position and an electronic zoom magnification ratio in a case of conducting an enlargement process by zooming.

FIG. 12 illustrates an example of the relationship between the position in the x-axis direction of the main image and the zoom magnification ratio in the case of conducting an enlargement process by electronic zooming. In FIG. 12, the horizontal axis represents the position in the x-axis direction of the main image (center and both edges), while the vertical axis represents the magnification ratio Zh. Note that, although not illustrated, the relationship between the y-axis direction of the main image and the magnification ratio Zv is also similar to FIG. 12. As illustrated in FIG. 12, if the position in the main image becomes a certain distance or greater from the reference point (for example, the center of the image ($x\_in=0$)), the electronic zoom magnification ratio is reduced by Zh, with the electronic zoom magnification ratio being set to correspond to a magnification ratio of 1 at the screen edges.

Figure 13:
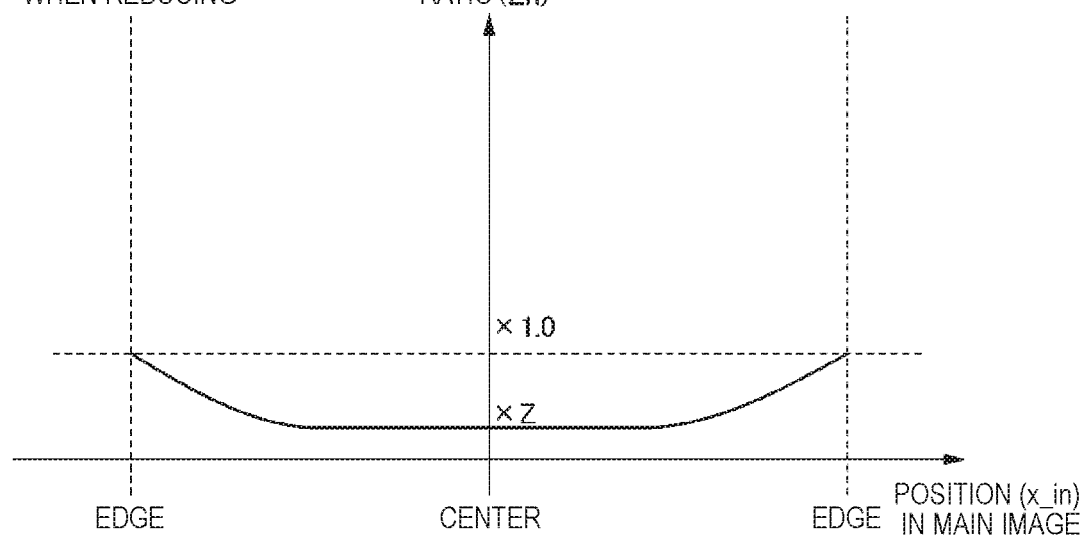
FIG. 13 is a diagram for explaining an example of the relationship between an in-image position and an electronic zoom magnification ratio in a case of conducting an enlargement process by zooming.

FIG. 13 illustrates an example of the relationship between the position in the x-axis direction of the main image (center and both edges) and the zoom magnification ratio in the case of conducting a reduction process by electronic zooming. The horizontal axis represents the position in the x-axis direction of the main image, while the vertical axis represents the magnification ratio Zh. Note that, although not illustrated, the relationship between the y-axis direction of the main image and the magnification ratio Zv is also similar to FIG. 13. As illustrated in FIG. 13, if the position in the main image becomes a certain distance or greater from the reference point (for example, the center of the image ($x\_in=0$)), the electronic zoom magnification ratio is enlarged by Zh, with the electronic zoom magnification ratio being set to correspond to a magnification ratio of 1 at the screen edges.

Figure 14:
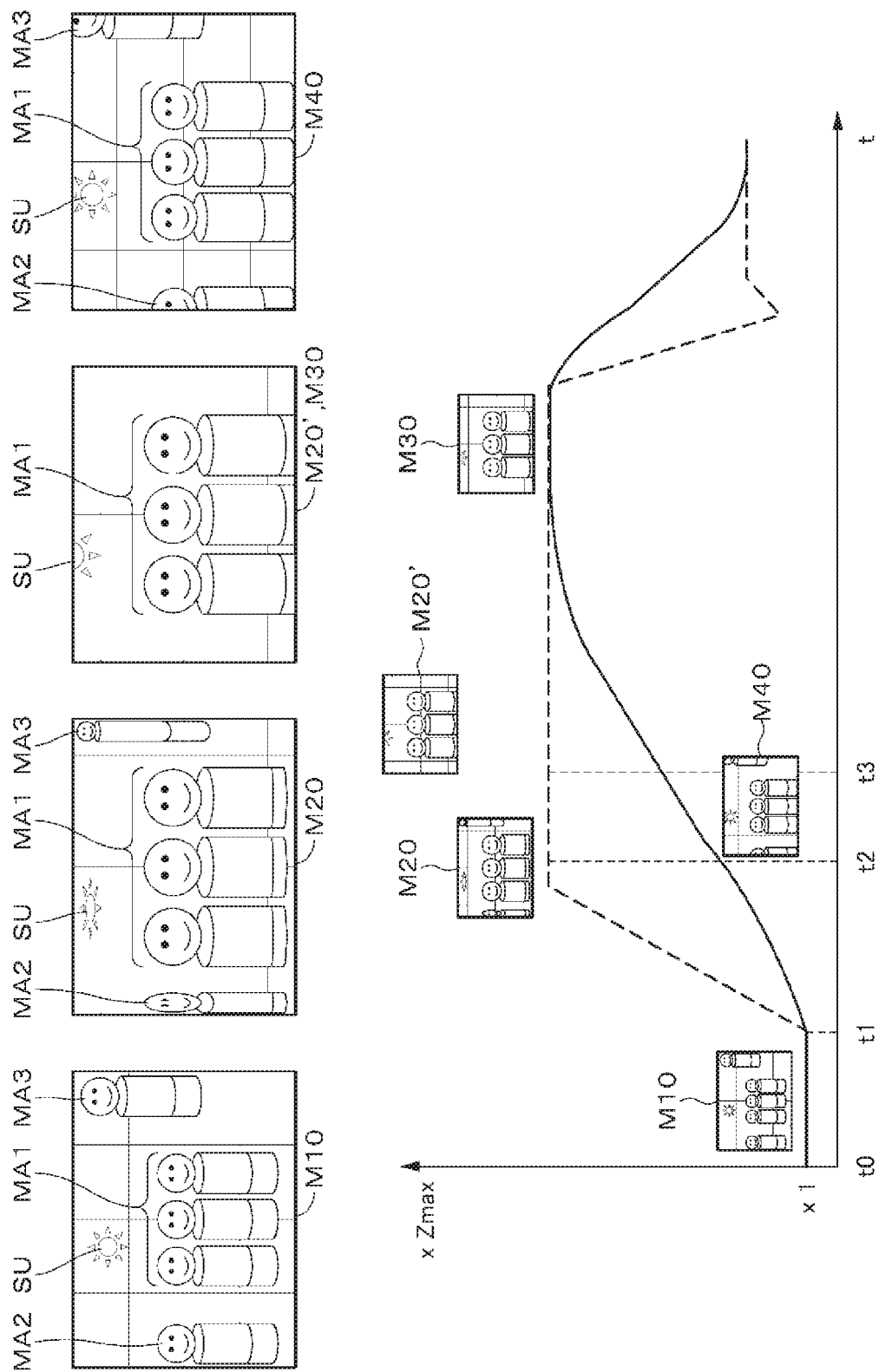
FIG. 14 is a diagram illustrating an example of monitoring images, main images, and the like according to zoom operations, according to a fourth embodiment.

FIG. 14 illustrates a specific example of image changes in the case of conducting an enlargement process by electronic zooming. The horizontal axis represents the time axis, while the vertical axis represents the zoom magnification ratio. In FIG. 14, the solid line represents change in the main image zoom magnification ratio, while the dashed line represents the monitoring image zoom magnification ratio. Details about the image M10, the image M20, the image M20' and image M30, and the image M40 in FIG. 14 will be discussed later. Note that the image M10, the image M20, the image M20' and image M30, and the image M40 are illustrated enlarged for the sake of convenience.

From time t0 to time t1, an initial image, namely the image M10, is displayed on the display unit. The image M10 includes three persons MA1 near the center, a person MA2 near the edge on the left side, a person MA3 near the edge on the right side, and the sun SU near the edge on top.

At time t1, a zoom operation (in this example, a zoom-in operation) is performed by the user. The image enlarged by the target zoom magnification ratio obtained according to the zoom operation is the image M20'. Also, the image obtained by the main image zoom magnification ratio between time t2 and time t3 is the main image M40. If the image M20' is displayed as the monitoring image at time t2, a difference from the image M40 is produced. Specifically, although the person MA2 and the person MA3 are not displayed in the image M20', the person MA2 and the person MA3 are included in the main image M40. For this reason, when the main image M40 is recorded, an image including the person MA2 and the person MA3 not being displayed to the user is recorded, and there is a risk of recording an image different from the user's intended image.

Accordingly, as described using FIG. 12, the electronic zoom magnification ratio near the center of the image is set equal to the target zoom magnification ratio, with the electronic zoom magnification ratio becoming smaller with increasing distance away from the area near the center. At this point, making the electronic zoom magnification ratio near the center of the image equal to the target zoom magnification ratio is because typically the subject that the user wants to zoom is often positioned in the center, and the user is able to recognize how this subject actually is enlarged in response to zoom operations.

The output image obtained in the case of conducting electronic zooming by the electronic zoom magnification ratio illustrated as an example in FIG. 12 is the image M20. When the image M20 is compared to the image M20' obtained by the target zoom magnification ratio, the image magnification ratios near the center of the images are equal. Consequently, the user is able to check how the subject near the center is enlarged in response to zoom operations. Additionally, at the periphery of the image M20, although the size of the image is reduced and the aspect ratio has changed, the person MA2, the person MA3, and the sun SU are displayed. Consequently, the user is able to check objects and the like displayed at the periphery, and recognize that these objects and the like will be recorded. Note that when zooming finally is completed, the main image zoom magnification ratio and the target zoom magnification ratio become equal, and the distortion at the periphery is resolved.

According to the fourth embodiment, since the display in the center of the monitoring image becomes an image reflecting the target zoom magnification ratio, the user is able to perform zoom operations without being aware of the smoothing process. Furthermore, since the periphery of the monitoring image indicates the recording area, for example, the user is able to check whether or not unwanted subjects will be depicted in the recorded image.

5. Modifications

The foregoing thus specifically describes embodiments of the present disclosure, but the present disclosure is not limited to the foregoing embodiments, and various modifications based on the technical ideas of the present disclosure are possible. Hereinafter, exemplary modifications will be described.

Figure 15:
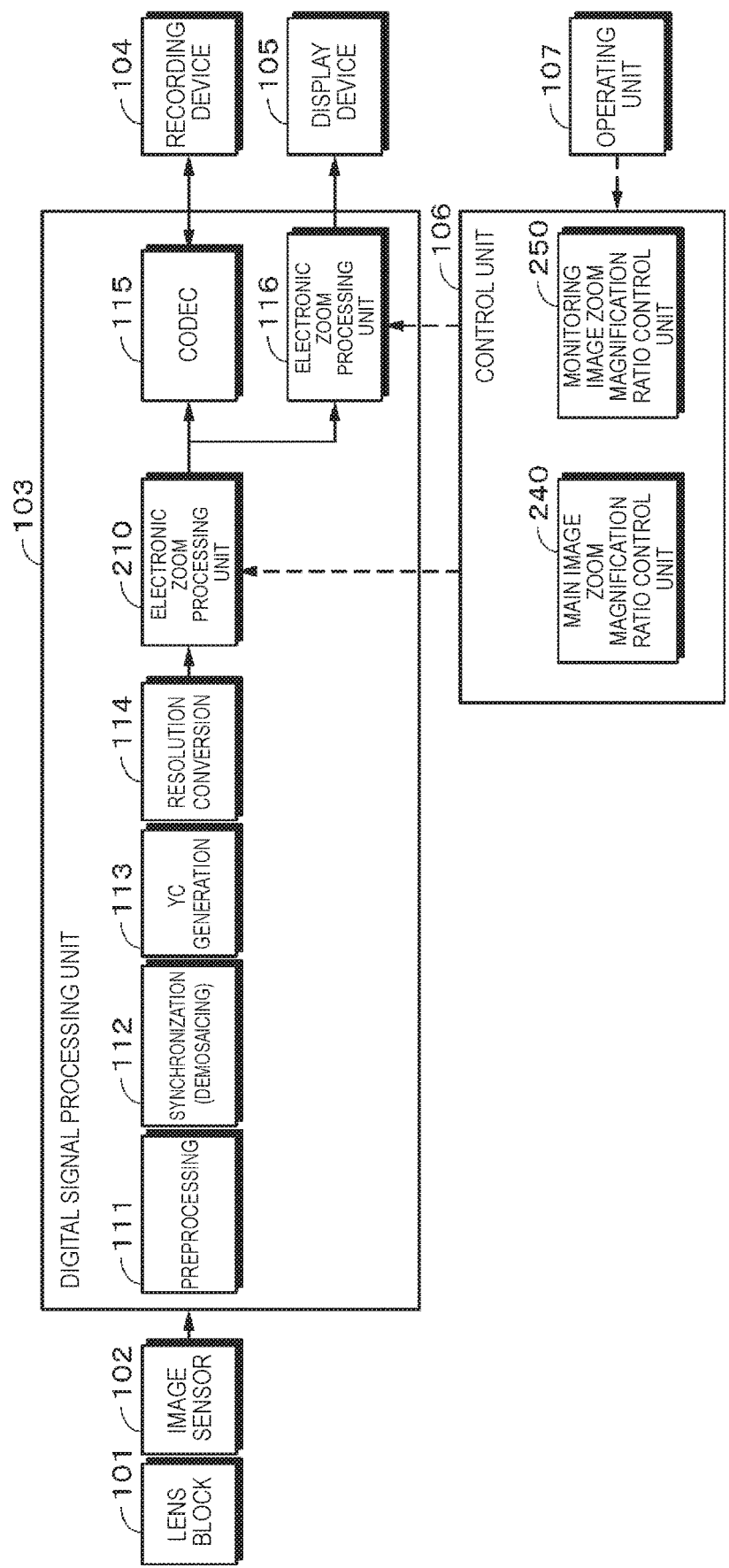
FIG. 15 is a diagram for explaining a modification.

FIG. 15 illustrates an example of the configuration of an imaging device according to a modification. In FIG. 15, part of the configuration of the imaging device is illustrated, while the configuration of the imaging device 1 discussed earlier may be applied for the part of the configuration that is not illustrated. As illustrated in FIG. 15, the digital signal processing unit 103 is provided with an electronic zoom processing unit 210. Additionally, a main image zoom magnification ratio control unit 220 and a monitoring image zoom magnification ratio control unit 230 are provided. The main image zoom magnification ratio control unit 220 controls the electronic zoom processing unit 210, while the monitoring image zoom magnification ratio control unit 230 controls the electronic zoom processing unit 210 and the electronic zoom processing unit 116 in a compound manner. Zoom control similar to the optical zooming on the main image in the foregoing embodiments may also be conducted through electronic zooming by the electronic zoom processing unit 210. Zoom control with respect to the monitoring image is realized by compound control through a first electronic zoom control by the electronic zoom processing unit 210 and a second electronic zoom control by the electronic zoom processing unit 116.

Figure 16:
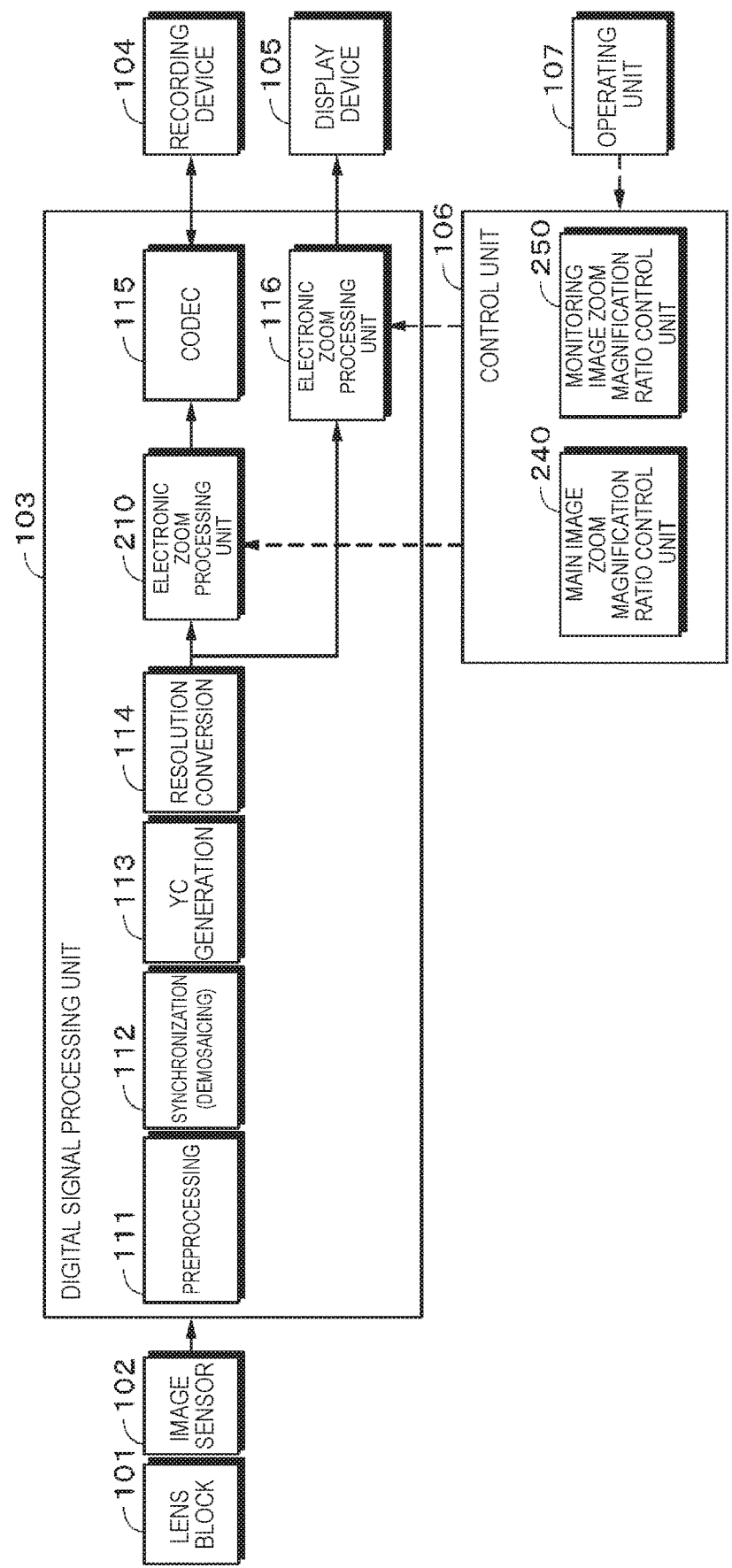
FIG. 16 is a diagram for explaining a modification.

FIG. 16 illustrates an example of the configuration of an imaging device according to another modification. In FIG. 16, part of the configuration of the imaging device is illustrated, while the configuration of the imaging device 1 discussed earlier may be applied for the part of the configuration that is not illustrated. The imaging device illustrated in FIG. 16 includes a main image zoom magnification ratio control unit 240 and a monitoring image zoom magnification ratio control unit. The main image zoom magnification ratio control unit 240 controls the electronic zoom processing unit 210, while the monitoring image zoom magnification ratio control unit 250 controls the electronic zoom processing unit 116. As illustrated in FIG. 16, when conducting a zoom-out process, the image from before electronic zooming is conducted by the electronic zoom processing unit 210 may be input into the electronic zoom processing unit 116. In this case, it is sufficient for the electronic zoom processing unit 210 to conduct the zoom control indicated by the solid line in FIG. 1, and the electronic zoom processing unit 116 to conduct the zoom control indicated by the dashed line in FIG. 1, for example. In this way, the zoom control with respect to the main image and the zoom control with respect to the monitoring image may also be electronic zoom controls that are parallel to each other.

In the case of taking the configuration illustrated in FIG. 16, the driving of the zoom lens with respect to the lens block 101 may also be conducted manually. In this case, the optical zoom magnification ratio becomes the target zoom magnification ratio. Accordingly, the image to be recorded is made to reach the main image zoom magnification ratio by the processing performed by the electronic zoom processing unit 210. Note that in this case, since the magnification ratio of the electronic zoom processing unit 116 used in the monitoring image is always 1, when lens driving is conducted only manually, a configuration that omits the electronic zoom processing unit 116 is also acceptable.

The present disclosure is not limited to being a device, and may also be realized by a method, a program, a system, or the like. A program may be provided to the user over a network, or through portable memory such as an optical disc or semiconductor memory.

Note that the configurations and processes in the embodiments and the modifications may also be combined appropriately, insofar as a technical contradiction is not produced. The order of the respective processes in the process flows given as an example may also be modified appropriately, insofar as a technical contradiction is not produced.

The present disclosure may also be applied to what is called a cloud system, in which the processes given as an example are processed in a distributed manner by multiple devices. The present disclosure may also be realized in a system in which the processes given as an example in the embodiments and the modifications are executed, as a device in which at least some of the processes given as an example are executed.

Additionally, the present technology may also be configured as below.

(1)

A zoom control device, including:

a zoom magnification ratio change speed setting unit that sets a main image zoom magnification ratio change speed and a monitoring image zoom magnification ratio change speed according to a zoom operation by a user; and a zoom control unit that conducts a zoom control on a main image so that a zoom magnification ratio changes according to the main image zoom magnification ratio change speed, and conducts a zoom control on a monitoring image so that the zoom magnification ratio changes according to the monitoring image zoom magnification ratio change speed, wherein the zoom magnification ratio change speed setting unit is configured to set the main image zoom magnification ratio change speed by smoothing the monitoring image zoom magnification ratio change speed.

(2)

The zoom control device according to (1), wherein the zoom control on the main image is an optical zoom control, and the zoom control on the monitoring image is a compound control made up of the optical zoom control, and an electronic zoom control on an image obtained according to the optical zoom control.

(3)

The zoom control device according to (2), wherein the zoom magnification ratio change speed setting unit
  sets, as the main image zoom magnification ratio change speed, a smoothed target zoom magnification ratio change speed obtained by smoothing a target zoom magnification ratio change speed obtained according to the zoom operation, and
  sets the monitoring image zoom magnification ratio change speed to a value combining the main image zoom magnification ratio change speed and an electronic zoom magnification ratio change speed decided based on the target zoom magnification ratio change speed and the smoothed target zoom magnification ratio change speed.

(4)

The zoom control device according to (3), wherein the zoom magnification ratio change speed setting unit sets the electronic zoom magnification ratio change speed to a value in a direction that cancels out the smoothing.

(5)

The zoom control device according to (4), wherein the zoom magnification ratio change speed setting unit changes a degree of smoothing according to an imaging condition.

(6)

The zoom control device according to (5), wherein the imaging condition includes recording and standing by to record, and the zoom magnification ratio change speed setting unit changes the degree of smoothing between the recording and the standing by to record.

(7)

The zoom control device according to (5), wherein the imaging condition includes a current position of a zoom lens, and the zoom magnification ratio change speed setting unit changes the degree of smoothing according to the current position of the zoom lens.

(8)

The zoom control device according to (5), wherein the imaging condition includes movement conditions of an imaging device, and the zoom magnification ratio change speed setting unit changes the degree of smoothing according to the movement conditions of the imaging device.

(9)

The zoom control device according to (5), wherein the imaging condition includes a presence or absence of a user indication for a zoom operation method which moves zoom faster compared to a normal zoom operation method and which is different from the normal zoom operation method, and the zoom magnification ratio change speed setting unit changes the degree of smoothing according to the presence or absence of the user indication.

(10)

The zoom control device according to (5), wherein the imaging condition includes an imaging mode, and the zoom magnification ratio change speed setting unit changes the degree of smoothing according to the imaging mode.

(11)

The zoom control device according to (10), wherein the imaging mode includes at least one of an overcrank imaging mode and an undercrank imaging mode, and a normal imaging mode, and the zoom magnification ratio change speed setting unit changes the degree of smoothing between the at least one of the overcrank imaging mode and the undercrank imaging mode, and the normal imaging mode.

(12)

The zoom control device according to (10), wherein the imaging mode includes a static image imaging mode that images a static image, and a dynamic image imaging mode that images a dynamic image, and the zoom magnification ratio change speed setting unit changes the degree of smoothing between the static image imaging mode and the dynamic image imaging mode.

(13)

The zoom control device according to (5), wherein the imaging condition includes a frame rate, and the zoom magnification ratio change speed setting unit changes the degree of smoothing according to the frame rate.

(14)

The zoom control device according to any of (1) to (13), wherein the zoom magnification ratio change speed setting unit sets the monitoring image zoom magnification ratio change speed to different speeds depending on a position in a screen.

(15)

The zoom control device according to (14), wherein the zoom magnification ratio change speed setting unit sets the monitoring image zoom magnification ratio change speed to mutually different speeds between an area near a center and an area near an edge in the screen.

(16)

The zoom control device according to (1), wherein
the zoom control on the main image is a first electronic zoom control, and
the zoom control on the monitoring image is a compound control made up of the first electronic zoom control, and a second electronic zoom control on an image that has been subjected to the first electronic zoom control.

(17)

The zoom control device according to (1), wherein
the zoom control on the main image and the zoom control on the monitoring image are electronic zoom controls that are parallel to each other.

(18)

A zoom control method, including:
setting, by a zoom magnification ratio change speed setting unit, a main image zoom magnification ratio change speed and a monitoring image zoom magnification ratio change speed according to a zoom operation by a user; and
conducting, by a zoom control unit, a zoom control on a main image so that a zoom magnification ratio changes according to the main image zoom magnification ratio change speed, and conducting a zoom control on a monitoring image so that the zoom magnification ratio changes according to the monitoring image zoom magnification ratio change speed, wherein
the zoom magnification ratio change speed setting unit sets the main image zoom magnification ratio change speed by smoothing the monitoring image zoom magnification ratio change speed.

(19)

A program causing a computer to execute a zoom control method including:
setting, by a zoom magnification ratio change speed setting unit, a main image zoom magnification ratio change speed and a monitoring image zoom magnification ratio change speed according to a zoom operation by a user; and
conducting, by a zoom control unit, a zoom control on a main image so that a zoom magnification ratio changes according to the main image zoom magnification ratio change speed, and conducting a zoom control on a monitoring image so that the zoom magnification ratio changes according to the monitoring image zoom magnification ratio change speed, wherein
the zoom magnification ratio change speed setting unit sets the main image zoom magnification ratio change speed by smoothing the monitoring image zoom magnification ratio change speed.

(20)

A zoom control device, including:
a monitoring image zoom magnification ratio control unit that controls an operation of changing a monitoring image zoom magnification ratio according to a monitoring image zoom magnification ratio change speed based on a zoom operation by a user; and
a main image zoom magnification ratio control unit that controls an operation of changing a main image zoom magnification ratio according to a main image zoom magnification ratio change speed obtained by conducting a smoothing process on the monitoring image zoom magnification ratio change speed.

(21)

An imaging device, including:
a zoom magnification ratio change speed setting unit that sets a main image zoom magnification ratio change speed and a monitoring image zoom magnification ratio change speed according to a zoom operation by a user; and
a zoom control unit that conducts a zoom control on a main image so that a zoom magnification ratio changes according to the main image zoom magnification ratio change speed, and conducts a zoom control on a monitoring image so that the zoom magnification ratio changes according to the monitoring image zoom magnification ratio change speed, wherein
the zoom magnification ratio change speed setting unit is configured to set the main image zoom magnification ratio change speed by smoothing the monitoring image zoom magnification ratio change speed.

(22)

An imaging device, including:
a monitoring image zoom magnification ratio control unit that controls an operation of changing a monitoring image zoom magnification ratio according to a monitoring image zoom magnification ratio change speed based on a zoom operation by a user; and
a main image zoom magnification ratio control unit that controls an operation of changing a main image zoom magnification ratio according to a main image zoom magnification ratio change speed obtained by conducting a smoothing process on the monitoring image zoom magnification ratio change speed.

REFERENCE SIGNS LIST

1 imaging device
104 recording device
105 display device
106 control unit
107 operating unit
108 lens driving unit
116 electronic zoom processing unit
120 zoom control unit

The invention claimed is:

1. An imaging apparatus comprising:
an image sensor configured to output an image signal; and
circuitry configured to
generate a monitoring image from the image signal,
generate a main image comprising a motion video image from the image signal while the monitoring image is generated,
set a monitoring image zoom change speed for the monitoring image and set a main image zoom change speed for the main image according to an operating signal received from an input corresponding to a user operation received while the main image and the monitoring image are being generated,
wherein the main image zoom change speed and the monitoring image zoom change speed are both non-zero change speeds, the main image zoom change speed is a variable speed that is set to be slower than the monitoring image zoom change speed, and the main image zoom change speed and the monitoring image zoom change speed are performed concurrently while the main image and the monitoring image are being generated.

2. The imaging apparatus according to claim 1,
wherein the main image is recorded in a recording medium or to transmitted to an external equipment.

3. The imaging apparatus according to claim 2,
wherein the monitoring image is displayed on a display device.

4. The imaging apparatus according to claim 1, wherein
the main image zoom change speed is set as a smoothed change speed that is obtained by smoothing a target zoom change speed obtained according to a zoom operation, and
the monitoring image zoom change speed is set to a value combining the main image zoom change speed and an electronic zoom change speed that is decided based on the target zoom change speed and the smoothed target zoom change speed.

5. The imaging apparatus according to claim 4, wherein
the smoothed change speed changes a degree of smoothing according to an imaging condition.

6. The imaging apparatus according to claim 5, wherein
the imaging condition includes a current position of a zoom lens, and
the degree of smoothing is changed according to the current position of the zoom lens.

7. The imaging apparatus according to claim 5, wherein
the imaging condition includes a movement condition of the imaging apparatus, and
the degree of smoothing is changed according to the movement condition.

8. The imaging apparatus according to claim 1, wherein
the monitoring image zoom change speed is set to cancel out a smoothing applied to the main image zoom change speed.

9. An imaging method comprising:
receiving an image signal from an image sensor;
generating a monitoring image from the image signal;
generating a main image comprising a motion video image from the image signal while the monitoring image is generated; and
setting a monitoring image zoom change speed for the monitoring image and setting a main image zoom change speed for the main image according to an operating signal received from an input corresponding to a user operation received while the main image and the monitoring image are being generated,
wherein the main image zoom change speed and the monitoring image zoom change speed are both non-zero change speeds, the main image zoom change speed is a variable speed that is set to be slower than the monitoring image zoom change speed, and the main image zoom change speed and the monitoring image zoom change speed are performed concurrently while the main image and the monitoring image are being generated.

10. The imaging method according to claim 9,
wherein the main image is recorded in a recording medium or to transmitted to an external equipment.

11. The imaging method according to claim 10,
wherein the monitoring image is displayed on a display device.

12. The imaging method according to claim 9, further comprising:
setting the main image zoom change speed as a smoothed change speed that is obtained by smoothing a target zoom change speed obtained according to a zoom operation; and
setting the monitoring image zoom change speed to a value combining the main image zoom change speed and an electronic zoom change speed that is decided based on the target zoom change speed and the smoothed target zoom change speed.

13. The imaging method according to claim 12, wherein
the smoothed change speed changes a degree of smoothing according to an imaging condition.

14. The imaging method according to claim 13, wherein
the imaging condition includes a current position of a zoom lens, and
the degree of smoothing is changed according to the current position of the zoom lens.

15. The imaging method according to claim 13, wherein
the imaging condition includes a movement condition of the imaging apparatus, and
the degree of smoothing is changed according to the movement condition.

16. The imaging method according to claim 9, further comprising:
setting the monitoring image zoom change speed to cancel out a smoothing applied to the main image zoom change speed.

17. A non-transitory computer readable medium storing program code for imaging, the program code being executable by a processor to perform operations comprising:
receiving an image signal from an image sensor;
generating a monitoring image from the image signal;
generating a main image comprising a motion video image from the image signal while the monitoring image is generated; and
setting a monitoring image zoom change speed for the monitoring image and setting a main image zoom change speed for the main image according to an operating signal received from an input corresponding to a user operation received while the main image and the monitoring image are being generated,
wherein the main image zoom change speed and the monitoring image zoom change speed are both non-zero change speeds, the main image zoom change speed is a variable speed that is set to be slower than the monitoring image zoom change speed, and the main image zoom change speed and the monitoring image zoom change speed are performed concurrently while the main image and the monitoring image are being generated.

18. The non-transitory computer readable medium according to claim 17, wherein the operations further comprise:
setting the main image zoom change speed as a smoothed change speed that is obtained by smoothing a target zoom change speed obtained according to a zoom operation; and
setting the monitoring image zoom change speed to a value combining the main image zoom change speed and an electronic zoom change speed that is decided based on the target zoom change speed and the smoothed target zoom change speed.

19. The non-transitory computer readable medium according to claim 18, wherein
the smoothed change speed changes a degree of smoothing according to an imaging condition.

20. The non-transitory computer readable medium according to claim 19, wherein
the imaging condition includes a current position of a zoom lens, and
the degree of smoothing is changed according to the current position of the zoom lens.

\* \* \* \* \*